United States Patent
Golitschek Edler von Elbwart et al.

(10) Patent No.: US 9,872,287 B2
(45) Date of Patent: Jan. 16, 2018

(54) TDD UPLINK/DOWNLINK CONFIGURATION ENHANCEMENTS

(71) Applicant: Panasonic Intellectual Property Corporation of America, Torrance, CA (US)

(72) Inventors: Alexander Golitschek Edler von Elbwart, Darmstadt (DE); Michael Einhaus, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/035,731

(22) PCT Filed: Jan. 13, 2015

(86) PCT No.: PCT/EP2015/050495
§ 371 (c)(1),
(2) Date: May 10, 2016

(87) PCT Pub. No.: WO2015/110317
PCT Pub. Date: Jul. 30, 2015

(65) Prior Publication Data
US 2016/0323852 A1    Nov. 3, 2016

(30) Foreign Application Priority Data

Jan. 21, 2014 (EP) .................................. 14000212

(51) Int. Cl.
*H04W 72/04* (2009.01)
*H04L 5/14* (2006.01)
(Continued)

(52) U.S. Cl.
CPC ......... *H04W 72/042* (2013.01); *H04L 1/1887* (2013.01); *H04L 1/1896* (2013.01);
(Continued)

(58) Field of Classification Search
None
See application file for complete search history.

(56) References Cited

U.S. PATENT DOCUMENTS

2013/0114472 A1\* 5/2013 Tamaki ................. H04L 1/1854
370/280
2014/0301290 A1\* 10/2014 He ......................... H04W 76/00
370/329
(Continued)

OTHER PUBLICATIONS

3GPP TS 25.331 V6.7.0, Sep. 2005, 1166 pages.
(Continued)

*Primary Examiner* — Anh Ngoc Nguyen
(74) *Attorney, Agent, or Firm* — Seed IP Law Group LLP

(57) ABSTRACT

The invention relates to the performing, by a mobile station, of a PUSCH transmission (3) in response to a DCI transmission (1). Specifically, in case a first TDD uplink/downlink configuration, according to which the communication is configured, is different from a second TDD uplink/downlink configuration, on the basis of which the DCI to PUSCH timing relations are defined (2a), and in case these DCI to PUSCH timing relations define plural timing relations for performing PUSCH transmissions in response to a single DCI transmission (2b), the mobile station applies a pre-stored association (2c) indicating a single timing relation that is to be used for determining the PUSCH transmission based on the subframe in which the corresponding DCI transmission is received (2d).

15 Claims, 13 Drawing Sheets

| Uplink/Downlink configuration | PUCCH or HARQ-ACK in subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7,6 | 4 | | | | 7,6 | 4 | |
| 2 | | | 8,7, 4,6 | | | | | 8,7, 4,6 | | |
| 3 | | | 7,6, 11 | 6,5 | 5,4 | | | | | |
| 4 | | | 12,8, 7,11 | 6,5, 4,7 | | | | | | |
| 5 | | | 13,12,9,8, 7,5,4,11,6 | | | | | | | |
| 6 | | | 7 | 7 | 5 | | | 7 | 7 | |

| 7 | PDSCH in subframe number n-k |
|---|---|

(51) Int. Cl.
H04L 1/18 (2006.01)
H04L 5/00 (2006.01)

(52) U.S. Cl.
CPC .......... *H04L 5/0044* (2013.01); *H04L 5/0048* (2013.01); *H04L 5/14* (2013.01); *H04L 5/1469* (2013.01); *H04W 72/0446* (2013.01); *H04L 5/0007* (2013.01); *H04L 5/0053* (2013.01)

(56) References Cited

U.S. PATENT DOCUMENTS

2015/0188690 A1* 7/2015 Khoryaev ......... H04W 52/0251
370/280
2015/0312905 A1* 10/2015 Seo .................. H04B 7/2656
370/280

OTHER PUBLICATIONS

3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8), Dec. 2009, 83 pages.

3GPP TS 36.212 V12.0.0, "3$^{rd}$ Generation Partnership Project; Technical Specification Group Radio Access Network; Evolved Universal Terrestrial Radio Access (E-UTRA); Multiplexing and channel coding (Release 12)," Dec. 2013, 88 pages.

3GPP TS 36.213 V11.1.0, "3$^{rd}$ Generation Partnership Project; Technical Specification Group Radio Access Network; Evolved Universal Terrestrial Radio Access (E-UTRA); Physical layer procedures (Release 11)," Dec. 2012, 160 pages.

3GPP TS 36.321 V12.0.0, "3$^{rd}$ Generation Partnership Project; Technical Specification Group Radio Access Network; Evolved Universal Terrestrial Radio Access (E-UTRA); Medium Access Control (MAC) protocol specification (Release 12)," Dec. 2013, 57 pages.

International Search Report dated Feb. 23, 2015, for corresponding International Application No. PCT/EP2015/050495, 2 pages.

Extended European Search Report dated Jul. 10, 2014, for corresponding EP Application No. 14000212.2-1851, 8 pages.

Sesia et al., "LTE The UMTS Long Term Evolution—From Theory to Practice," Wiley, 2011, Chapter 9.3, 24 pages.

Panasonic, "UL Index and DAI bits in DCI format 0/4," R1-140496, 3GPP TSG-RAN WG1 Meeting 76, Agenda Item: 7.2.1.4, Prague, Czech Republic, Feb. 10-14, 2014, 5 pages.

Renesas Mobile Europe Ltd., "Discussion on Enhancements for Dynamic TDD UL-DL Configuration," R1-122363, 3GPP TSG-RAN WG1 Meeting #69, Agenda Item: 7.10.4, Prague, Czech Republic, May 21-25, 2012, 4 pages.

ZTE, "Issues about HARQ timing in TDD-eIMTA," R1-133052, 3GPP TSG RAN WG1 Meeting #74, Agenda Item: 7.2.3.3, Barcelona, Spain, Aug. 19-23, 2013, 4 pages.

* cited by examiner

| Uplink-downlink configuration | Downlink-to-Uplink Switch-point periodicity | Subframe number ||||||||||| Number of |||
|---|---|---|---|---|---|---|---|---|---|---|---|---|---|---|
| | | 0 | 1 | 2 | 3 | 4 | 5 | 6 | 7 | 8 | 9 | D | U | S |
| 0 | 5 ms  | D | S | U | U | U | D | S | U | U | U | 2 | 6 | 2 |
| 1 | 5 ms  | D | S | U | U | D | D | S | U | U | D | 4 | 4 | 2 |
| 2 | 5 ms  | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms  | D | S | U | U | U | D | S | U | U | D | 3 | 5 | 2 |

D    Downlink subframe

U    Uplink subframe

S    Special subframe

Fig. 5

| Uplink/Downlink configuration | PUCCH or HARQ-ACK in subframe number n |||||||||| 
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7,6 | 4 | | | | 7,6 | 4 | |
| 2 | | | 8,7,4,6 | | | | | 8,7,4,6 | | |
| 3 | | | 7,6,11 | 6,5 | 5,4 | | | | | |
| 4 | | | 12,8,7,11 | 6,5,4,7 | | | | | | |
| 5 | | | 13,12,9,8,7,5,4,11,6 | | | | | | | |
| 6 | | | 7 | 7 | 5 | | | 7 | 7 | |

| 7 | PDSCH in subframe number n-k |
|---|---|

Fig. 6

| Uplink/Downlink Configuration | PDCCH in subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4,7 | 6,7 | | | | 4,7 | 6,7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

| 4 | PUSCH in subframe number n+k

Fig. 7

| Operated UL/DL configuration | DCI transmission of format 0/4 in subframe n | Assumed UL index bits (MSB, LSB) |
|---|---|---|
| UL/DL configuration #1 | 0, 1, 5, 6 | (0, 1) |
| UL/DL configuration #2 | 0, 5 | (0, 1) |
| | 1, 6 | (1, 0) |
| UL/DL configuration #3 | 0 | (1, 0) |
| | 1 | N/A |
| | 5, 6 | (0, 1) |
| UL/DL configuration #4 | 0, 1 | N/A |
| | 5, 6 | (0, 1) |
| UL/DL configuration #5 | 0, 1 | N/A |
| | 5 | (0, 1) |
| | 6 | (1, 0) |
| UL/DL configuration #6 | 0 | (1, 0) |
| | 1 | (1, 0) |
| | 5, 6 | (0, 1) |

Fig. 10

| DCI transmission in subframe n | Assumed UL index bits (MSB, LSB) |
|---|---|
| 0, 1 | (1, 0) |
| 5, 6 | (0, 1) |

Fig. 13

TDD UPLINK/DOWNLINK CONFIGURATION ENHANCEMENTS

FIELD OF THE INVENTION

The invention relates to enhancements in the TDD uplink/downlink configuration mechanism. In particular, the invention describes methods for performing Physical Uplink Shared Channel, PUSCH, transmissions by a mobile station in response to Downlink Control Information, DCI, transmissions. The invention is also providing the mobile station and the base station for participating in the methods described herein.

TECHNICAL BACKGROUND

Long Term Evolution (LTE)

Third-generation mobile systems (3G) based on WCDMA radio-access technology is being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In subsequent releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e. uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems.

In TDD this has the additional circumstance that the transmission and reception occur on the same carrier frequency, i.e. downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 5 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 5 shows the frame structure type 2, particularly for a 5 ms switch-point periodicity, i.e. for TDD configurations 0, 1, 2 and 6. FIG. 8 illustrates a radio frame, being 10 ms in length, and the corresponding two half-frames of 5 ms each. The radio frame consists of 10 subframes with each 1 ms, where each of the subframes is assigned the type of uplink, downlink or special, as defined by one of the Uplink-downlink configurations according to the table of FIG. 5.

As can be appreciated from FIG. 5, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as a multiple of the sample time $T_s=(1/30720)$ ms as defined for 3GPP LTE Release 11.

TABLE

| special subframe configurations, Frame Structure Type 2 | | | | | | |
|---|---|---|---|---|---|---|
| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UL/DL ACK/NACK feedback.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel or on the Enhanced Physical Downlink Control Channel; without loss of generality this description will simply refer to both transmission channels as PDCCH. A PDCCH carries a message as a Downlink Control Information (DCI), which in most cases includes resource assignments and other control information for a mobile station or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e. resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink index ("UL INDEX") or downlink assignment index ("DAI") that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (latest available version v12.0.0 for Release available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile station for contention-free random access.

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1 D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation.

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank.

Format 2B: Introduced in Release 9 and is used for the transmission of resource assignments for PDSCH for dual-layer beamforming.

Format 2C: Introduced in Release 10 and is used for the transmission of resource assignments for PDSCH for closed-loop single-user or multi-user MIMO operation with up to 8 layers.

Format 2D: has been introduced in Release 11 and is used for up to 8 layer transmissions; mainly used for COMP (Cooperative Multipoint).

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB. The number of bits indicated in the right column include the bits for the CRC of the particular DCI.

TABLE

DCI Formats

| DCI format | Purpose | Number of bits including CRC |
|---|---|---|
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation, COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

In order that the UE can identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g. a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

TABLE

RNTIs

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Timing for Uplink Transmissions in Response to DCI Transmissions

There is a particular predefined timing relation between uplink resource assignments transmitted by DCI received in a subframe and the corresponding uplink transmission in PUSCH. Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference.

For an uplink grant (i.e. resource assignment) for transmissions on the physical uplink shared channel (PUSCH), the PDCCH assigns a PUSCH resource for (user) data; in the case of LTE FDD, the assigned PUSCH transmissions occurs with an offset of four subframes later relative to the subframe where the uplink grant is transmitted on PDCCH. In the case of LTE TDD, the assigned PUSCH transmissions occurs with an offset of at least four subframes later relative to the subframe where the uplink grant is transmitted on PDCCH.

In particular, Table 8-2 of TS 36.213 which together with the related description in section 8.0 of TS 36.213 is the basis for FIG. 7 defining the parameter k for the TDD configurations 0-6, where k indicates the positive subframe offset to determine the target uplink subframe in response to an uplink resource allocation received in a subframe n. For instance, the parameter k is 6 for subframe n=1 of TDD configuration 1, meaning that an uplink resource allocation received in subframe 1 of TDD configuration 1 is intended for subframe 1+6=7 of TDD configuration 1, which indeed is an uplink subframe, etc.

It is important to note that TDD configuration 0 according to FIG. 7 allows a choice of one or more subframe offsets, which will be described in more detail with respect to the UL Index field of a DCI transmission.

Uplink Index Field

The specification of DCI formats 0 and 4 prescribes that an uplink grant contains 2 bits referred to as UL Index bits in case of TDD configuration 0. As can be seen from FIG. 5, TDD configuration 0 defines 4 out of 10 subframes as downlink or special subframe thereby allowing for DCI transmission (D and S subframes) and defines 6 out of 10 subframe as uplink subframes thereby allowing for PUSCH transmission (U subframes). In order to be able to assign 6 uplink subframes from 4 DCI subframes, the DCI to PUSCH timing relations in FIG. 7 provide for multiple timing offsets for a given DCI transmission to determine the granted uplink subframe for transmission.

A selection among the multiple timing offsets is facilitated by the inclusion of the UL Index bits. Depending on the value of the UL Index bits, either the first offset, or the second offset, or both, the first and the second offset listed in FIG. 7 are determined as the applicable offset, thereby granting one or two uplink transmissions corresponding to one or both offsets listed in FIG. 7 for a single DCI, respectively.

For example, the potential offsets defined in FIG. 7 for TDD configuration 0 and for subframe n=0 are "4,7". If the UL Index bits (MSB,LSB) received in DCI format 0 or 4 indicate the value '(1,0)', then the corresponding uplink transmission offset k is determined as 4, and therefore the uplink transmission is granted for subframe 0+4=4. If the UL Index bits indicate the value '(0,1)', then the corresponding uplink transmission offset k is determined as 7, and therefore the uplink transmission is granted for subframe 0+7=7. If the UL Index bits indicate the value '(1,1)', then the corresponding uplink transmission offsets k are determined as 4 and 7, and therefore an uplink transmission is granted for subframes 0+4=4 and 0+7=7. Likewise, for DCI format 0 or 4 in subframe n=1 the UL Index bits determine whether the grant corresponds to a transmission in subframe 1+6=7, or in subframe 1+7=8, or in both subframe 1+6=7 and 1+7=8.

Downlink Assignment Index (DAI)

In TDD configurations 1-6, DCI formats 0 and 4 contain 2 DAI bits instead of the UL Index bits. As those TDD configurations contain fewer or the same number of U subframes as uplink grant transmission opportunities, it is not necessary to establish an ambiguous relation between a DCI transmission and corresponding uplink subframes. This is reflected by the fact that FIG. 7 shows at most just one offset value k for each subframe potentially transmitting DCI n for TDD configurations 1-6.

Conversely, these configurations potentially carry more downlink transmissions than uplink transmissions. Therefore the inverse problem occurs that multiple Hybrid ARQ ACK/NACK messages need to be transmitted in a single uplink subframe. The effect can be seen in FIG. 6, and is further described below as HARQ feedback for TDD Operation.

As such a multiple Hybrid ARQ ACK/NACK transmission requires so-called ACK/NACK multiplexing or bundling (more details in Sesia, section 23.4.3), the terminal preferably is aware of the number of ACK/NACK messages that are to be multiplexed or bundled, so as to make the ACK/NACK transmission itself resource-efficient. However a problem arises because the DCI signalling carrying downlink assignments for PDSCH is not 100% reliable, so there can be cases when a DCI transmitted is not (correctly) detected by the intended receiver, i.e. it is "missed" or "lost".

Due to the design of the DCI transmission, the receiver is not aware of such a "miss" or "loss", and therefore it might misjudge the number of expected ACK/NACK messages. In order to help avoid this problem, the Downlink Assignment Index (DAI) is included in DCI messages. This DAI is (among others) present in DCI formats 0 and 4 if TDD configurations 1-6 are applicable, which indicates the number of subframes for which the receiver is expected to perform ACK/NACK multiplexing or bundling.

Uplink Hybrid ARQ

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e. the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e. only a NACK is received) or whether eNode B requests a synchronous adaptive retransmission (i.e. PDCCH is signaled).

HARQ Feedback for TDD Operation

As explained above, transmission of downlink or uplink data with HARQ requires that ACKnowledgements (ACK or Negative ACK) be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment. However, in the case of TDD operation, subframes are designated on a cell-specific basis as uplink or downlink or special (see next chapter), thereby constraining the times at which resource grants, data transmissions, acknowledgments and retransmissions can be sent in their respective directions. The LTE design for TDD therefore supports grouped ACK/NACK transmission to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 5) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 10.1.3, incorporated herein by reference explains the TDD HARQ-ACK feedback procedure.

Table 10.1.3-1 of TS 36.213 which is reproduced in FIG. 6 gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9−4=5; subframe 5 of TDD configuration 0 being indeed a downlink subframe (see FIG. 5).

In HARQ operation, the eNB can transmit different coded version from the original TB in retransmissions so that the UE can employ incremental redundancy (IR) combining [8] to get additional coding gain over the combining gain. However in realistic systems, it is possible that the eNB transmits a TB to one specific UE on one resource segment, but the UE can not detect the data transmission due to DL control information lost. In this case, IR combining will lead to very poor performance for decoding the retransmissions because the systematic data has not been available at the UE. To mitigate this problem the UE should feed back a third state, namely discontinuous transmission (DTX) feedback, to indicate that no TB is detected on the associated resource segment (which is different from NACK indicating the decoding failure).

TDD UL/DL Reconfiguration

The mechanism for adapting UL-DL allocation up to and including LTE Release 11 is based on the system information acquisition procedure or the system information change procedure, where the particular UL-DL TDD configuration is indicated by a SIB, in this case/specifically by the TDD-config parameter in SIB1 (for details on the broadcast of system information, 3GPP TS 25.331, "Radio Resource Control (RRC)", version 6.7.0, section 8.1.1, incorporated herein by reference).

In the system information change procedure as specified in LTE Release 8-11, the supported time scale for a TDD UL/DL re-configuration is every 640 ms or longer. When re-using the ETWS (Earthquake and Tsunami Warning System), the supported time scale for UL-DL TDD re-configuration is every 320 ms or longer depending on the configured default paging cycle.

Nevertheless, the semi-static allocation of TDD UL/DL configuration may or may not reflect the instantaneous traffic situation. In case of rapid changes between an uplink-dominated to a downlink-dominated traffic situation, the system information change procedure is too slow for a dynamic TDD UL/DL re-configuration. Accordingly, the semi-static TDD UL/DL re-configuration is too slow to maximize the subframe utilization with respect to the instantaneous traffic situation.

In this respect, a dynamic TDD UL/DL re-configuration has been widely discussed in connection with LTE Release 12. The dynamic TDD UL/DL re-configuration is anticipated to adapt the TDD UL/DL configuration to the current traffic needs, for instance, to dynamically create more downlink subframes to increase the downlink bandwidth or to dynamically create more blank uplink subframes in order to mitigate interference to communications e.g. in uplink or downlink or to/from a neighboring cell.

In particular, LTE Release 12 will support an explicit signaling, i.e. DCI-based signaling via PDCCH, for the dynamic TDD UL/DL re-configuration. The signaling mechanism shall enable low-delay distribution of information on the TDD UL/DL re-configuration within the communication system and shall allow the mobile station/base station to re-configure the TDD UL/DL configuration without considerable delay.

With the above defined system constraints, the dynamic TDD UL/DL re-configuration will have to overcome incompatibilities between DCI to PUSCH timing relations as well as PDSCH to HARQ-ACK timing relations that are defined for each of the TDD configurations. It is therefore envisaged that the determination of uplink, downlink, and special subframes is based on a UL/DL configuration transmitted by a DCI signal ("operated UL/DL configuration"), while the DCI to PUSCH timing relation ("UL HARQ Reference Configuration") is determined by the UL/DL configuration indicated in SIB1, and the PDSCH to HARQ-ACK timing relation ("UL HARQ Reference Configuration") is configured by an RRC parameter and can represent UL/DL configurations 2, 4, or 5.

Exemplarily, FIG. 9 shows a case where the UL HARQ Reference Configuration is UL/DL configuration 0, and where the operated UL/DL configuration is UL/DL configuration 1. FIG. 9 shows how the timing as defined by the UL HARQ Reference Configuration relates to the subframes that are available for uplink transmissions according to the operated UL/DL configuration. As UL/DL configuration 0 supports two offset values for subframe 0, 1, 5, 6, two dash-dotted arrows originate in those subframes. Therefore a PUSCH transmission in subframe 7 could be granted by a DCI transmitted in subframe 0 as well as by a DCI transmitted in subframe 1, and a DCI transmitted in subframe 1 could grant a PUSCH transmission in subframe 7 and/or 8. Especially in order to resolve the latter ambiguity, UL Index bits should be available in the corresponding DCI.

Problem Statement

One problem arises due to the definition of DCI format 0 and 4 in 3GPP TS 36.212 resulting from the presence of UL Index bits and DAI bits (quoted therefrom, with emphasis added):

UL index—2 bits as defined in sections 5.1.1.1, 7.2.1, 8 and 8.4 of [3] (this field is present only for TDD operation with uplink-downlink configuration 0)

Downlink Assignment Index (DAI)—2 bits as defined in section 7.3 of [3] (this field is present only for TDD operation with uplink-downlink configurations 1-6)

Applying these definitions straightforwardly to the reconfiguration cases, for simplicity we assume that those skilled in the art identifies the operated UL/DL configuration as the "TDD operation" indicated in the specification. As a consequence, in the general case of using UL/DL configurations 1-6 as the operated UL/DL configuration, DCI formats 0 and 4 contain 2 DAI bits but no UL Index bits. This understanding seems reasonable because the DAI help to alleviate HARQ-ACK feedback problems relevant for downlink data transmissions, which is one important scenario for operating an operated TDD UL/DL configuration.

In order not to reduce the performance of legacy user equipment, same preferably operate an UL/DL configuration that offers a large number of uplink subframes, such as UL/DL configuration 0. Yet, as can be seen in FIG. 9, UL/DL configuration 0 ambiguously defines the DCI to PUSCH timing relations such that normally the UL Index bits would be required. However, in such a scenario, the UL Index bits are not contained in the DCI format.

It is therefore an objective of the present invention to allow the presence of DAI bits in DCI format 0 or 4, and furthermore to resolve the DCI to PUSCH ambiguity resulting from dynamic reconfiguration cases when UL Index bits are not contained in DCI format 0 or 4. This is particularly helpful to keep the size of the DCI message reasonably small to ensure a good coverage and robustness against errors, resulting in few lost DCI messages. This is especially important for DCI format 0, because the payload size of DCI format 0 is also the minimum payload size for DCI format 1A assigning downlink transmissions. In other words, a large payload size of DCI format 0 would mandate a large payload size of DCI format 1A without any benefit for the corresponding downlink transmission.

SUMMARY OF THE INVENTION

One object of the invention is to provide for an improved UL/DL configuration, that solves the problems of the prior art as discussed above.

The object is solved by the subject matter of the independent claims. Advantageous embodiments are subject to the dependent claims.

The various embodiments of the invention are based on the concept that the DCI to PUSCH timing relations are to be applied differently (i.e. separately) from the TDD radio frame configuration. In other words although the DCI to PUSCH timing relations are based on a TDD UL/DL configuration, this TDD UL/DL configuration may be set differently from the TDD UL/DL configuration defining the TDD radio frame configuration.

According to a first aspect of the invention, an operation of performing a Physical Uplink Shared CHannel, PUSCH, transmission in response to a Downlink Control Information, DCI, transmission is defined. As will become apparent from the following, this operation is adversely affected by the concept of applying two different TDD UL/DL configurations, namely a first TDD UL/DL configuration for defining the TDD radio frame configuration and a second TDD UL/DL configuration for defining the DCI to PUSCH timing relations.

Specifically, on the basis of the second TDD UL/DL configuration, the DCI to PUSCH timing relations is defined. These DCI to PUSCH timing relations specify subframe offsets which, in combination with the subframe in which the corresponding DCI transmission is received, indicate one or plural subframe(s) in which the PUSCH transmission(s) may potentially be performed. Yet, for the PUSCH transmission(s) to actually be performed in the indicated one or plural subframes, same must be defined as uplink subframes by the first TDD UL/DL configuration.

This specialty can be coped with on the system level by controlling the subframes in which DCI transmission, in response to which a PUSCH transmission is to be performed, are effected. In other words, in case of different configurations of the DCI to PUSCH timing relations and of the TDD UL/DL configuration, only those subframes can be used for DCI transmission which allow for subsequent PUSCH transmissions on the basis of the applied configurations.

However, ambiguities in the DCI to PUSCH timing relations present the communication with difficulties which cannot be coped with on the system level. In this respect, the invention defines a pre-stored association which indicates single (i.e. unambiguous) timing relations which can be used for performing a PUSCH transmission in response to a corresponding DCI transmission. Specifically, having pre-stored this association within the communication system, a single subframe for performing the PUSCH transmission is defined even in case of ambiguities in the DCI to PUSCH timing relations defined according to the second TDD UL/DL configuration.

In particular, the association is referred to in case the first TDD UL/DL configuration is different from the second TDD UL/DL configuration, and in case the DCI to PUSCH timing relations define plural timing relations for performing PUSCH transmissions in response to a single DCI transmission. Alternatively, the association may also be referred to in case the first TDD UL/DL configuration is different from the second TDD UL/DL configuration and in case the second TDD UL/DL configuration is TDD UL/DL configuration 0. Further alternatively, the association may also be referred to in case the first TDD UL/DL configuration prescribes DCI transmissions that assign uplink transmissions to include DAI bits instead of uplink index bits, and in case the DCI to PUSCH timing relations define plural timing relations for performing PUSCH transmissions in response to a single DCI transmission. All three 2-step determinations may be considered alternatives and equally lead to a state where the pre-stored association of the invention is required to cope with ambiguities in the DCI to PUSCH timing relations.

According to a first embodiment, in line with the first aspect of the invention, a method is proposed for performing a Physical Uplink Shared CHannel, PUSCH, transmission by a mobile station in response to a Downlink Control Information, DCI, transmission. The mobile station utilizes Time Division Duplex, TDD, communication based on at least one of a plurality of UL/DL configurations.

The mobile station is configured for communication with a base station in a communication system according to a first of the plurality of UL/DL configurations. Each of the plurality of UL/DL configurations defines the subframes of a radio frame as an uplink subframe, a downlink subframe or a special subframe. The mobile station further applies DCI to PUSCH timing relations for the communication on the basis of a second of the plurality UL/DL configurations. The DCI to PUSCH timing relations define one or plural timing relation(s) for performing one or plural PUSCH transmission(s) in response to a single DCI transmission.

According to the method, the mobile station receives in a subframe a DCI transmission in response to which a PUSCH transmission is to be performed. The subframe, in which the DCI transmission is received, is defined by the first UL/DL configuration as downlink subframe or special subframe. Then, the mobile station determines, by applying the DCI to PUSCH timing relations, a single timing relation for a PUSCH transmission according to the subframe in which the corresponding DCI transmission is received. Further, the mobile station performs the PUSCH transmission in a single subframe defined as an uplink subframe by the first UL/DL configuration, the uplink subframe corresponding to the determined single timing relation.

In case the first UL/DL configuration, according to which the communication is configured, is different from the second UL/DL configuration, on the basis of which the DCI to PUSCH timing relations are defined, and in case these DCI to PUSCH timing relations define plural timing relations for performing PUSCH transmissions in response to a single DCI transmission, the mobile station refers, as part of the determination, to a pre-stored association indicating the single timing relation among the plural timing relations that is to be used for the PUSCH transmission based on the subframe in which the corresponding DCI transmission is received.

According to a second embodiment, in line with the first aspect of the invention, a mobile station is suggested for performing a Physical Uplink Shared CHannel, PUSCH, transmission in response to a Downlink Control Information, DCI, transmission. The mobile station utilizes Time Division Duplex, TDD, communication based on at least one of a plurality of UL/DL configurations.

The mobile station is configured for communication with a base station in a communication system according to a first of the plurality of UL/DL configurations. Each of the plurality of UL/DL configurations defines the subframes of a radio frame as an uplink subframe, a downlink subframe or a special subframe. The mobile station further applies DCI to PUSCH timing relations for the communication on the basis of a second of the plurality UL/DL configurations. The DCI to PUSCH timing relations define one or plural timing relation(s) for performing one or plural PUSCH transmission(s) in response to a single DCI transmission.

The mobile station comprises a receiving circuit configured to receive in a subframe a DCI transmission in response to which a PUSCH transmission is to be performed. The subframe, in which the DCI transmission is received, is defined as downlink subframe or special subframe by the first UL/DL configuration. Then, the mobile station comprises a processor configured to determine, by applying the DCI to PUSCH timing relations, a single timing relation for a PUSCH transmission according to the subframe in which the corresponding DCI transmission is received. Further, the mobile station comprises a transmitting circuit configured to perform the PUSCH transmission in a single subframe defined as an uplink subframe by the first UL/DL configuration. The uplink subframe corresponds to the determined single timing relation.

In case the first UL/DL configuration, according to which the communication is configured, is different from the second UL/DL configuration, on the basis of which the DCI to PUSCH timing relations are defined, and in case these DCI to PUSCH timing relations define plural timing relations for performing PUSCH transmissions in response to a single DCI transmission, the processor is configured to refer to a pre-stored association indicating the single timing relation among the plural timing relations that is to be used for the PUSCH transmission based on the subframe in which the corresponding DCI transmission is received.

According to a third embodiment, in line with the first aspect of the invention, a computer readable medium is proposed which stores instruction that, when executed by a processor of a mobile station, cause the mobile station to perform a Physical Uplink Shared CHannel, PUSCH, transmission in response to a Downlink Control Information, DCI, transmission. The mobile station utilizes Time Division Duplex, TDD, communication based on at least one of a plurality of UL/DL configurations.

The mobile station is configured for communication with a base station in a communication system according to a first of the plurality of UL/DL configurations. Each of the plurality of UL/DL configurations defines the subframes of a radio frame as an uplink subframe, a downlink subframe or a special subframe. The mobile station further applies DCI to PUSCH timing relations for the communication on the basis of a second of the plurality UL/DL configurations. The DCI to PUSCH timing relations define one or plural timing relation(s) for performing one or plural PUSCH transmission(s) in response to a single DCI transmission.

The mobile station is caused to perform the steps of: receiving in a subframe, defined as downlink subframe or special subframe, a DCI transmission in response to which a PUSCH transmission is to be performed; determining, by applying the DCI to PUSCH timing relations, a single timing relation for a PUSCH transmission according to the subframe in which the corresponding DCI transmission is received; and performing the PUSCH transmission in a single subframe defined as an uplink subframe by the first UL/DL configuration, the uplink subframe corresponding to the determined single timing relation.

In case the first UL/DL configuration, according to which the communication is configured, is different from the second UL/DL configuration, on the basis of which the DCI to PUSCH timing relations are defined, and in case these DCI to PUSCH timing relations define plural timing relations for performing PUSCH transmissions in response to a single DCI transmission, the mobile station is to refer, as part of the determining step, to a pre-stored association indicating the single timing relation among the plural timing relations that is to be used for the PUSCH transmission based on the subframe in which the corresponding DCI transmission is received.

BRIEF DESCRIPTION OF THE FIGURES

In the following the invention is described in more detail with reference to the attached figures and drawings.

FIG. 5 shows the seven currently-standardized (static) TDD UL/DL configurations 0-6, the respective definitions of the 10 subframes and their switch-point periodicity, FIG. 6 illustrates the HARQ ACK/NACK/DTX feedback timing for the static UL/DL configurations 0-6 as defined by 3GPP LTE, FIG. 7 illustrates Physical Uplink Shared CHannel, PUSCH, transmission timings in response to a Downlink Control Information, DCI, transmission for the static UL/DL configurations 0-6 as defined by 3GPP LTE.

DETAILED DESCRIPTION OF THE INVENTION

Figure 1:
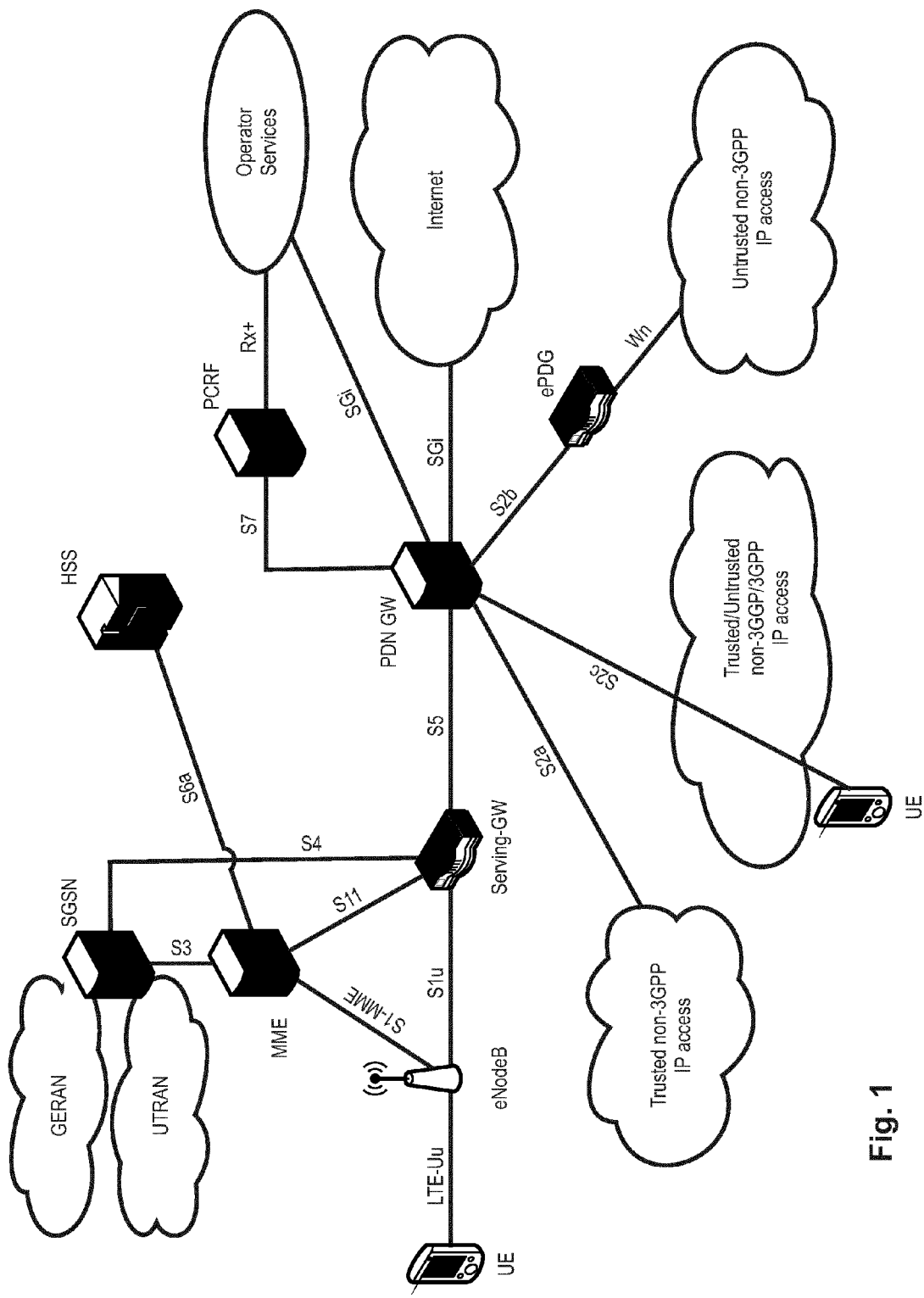
FIG. 1 shows an exemplary architecture of a 3GPP LTE system.
Figure 2:
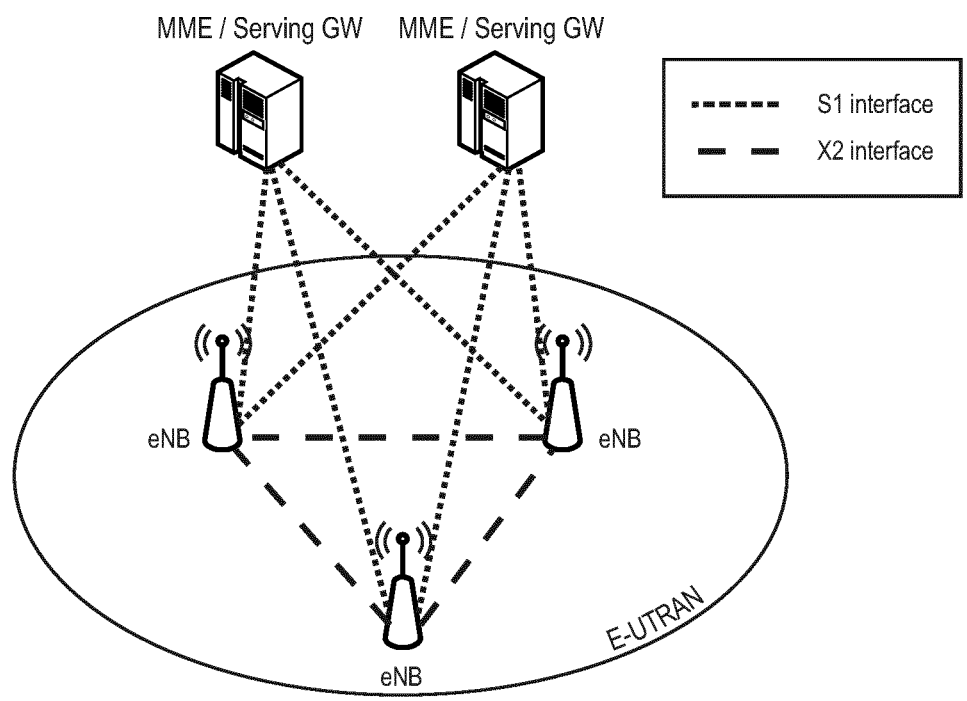
FIG. 2 shows an exemplary overview of the overall E-UTRAN architecture of 3GPP LTE.
Figure 3:
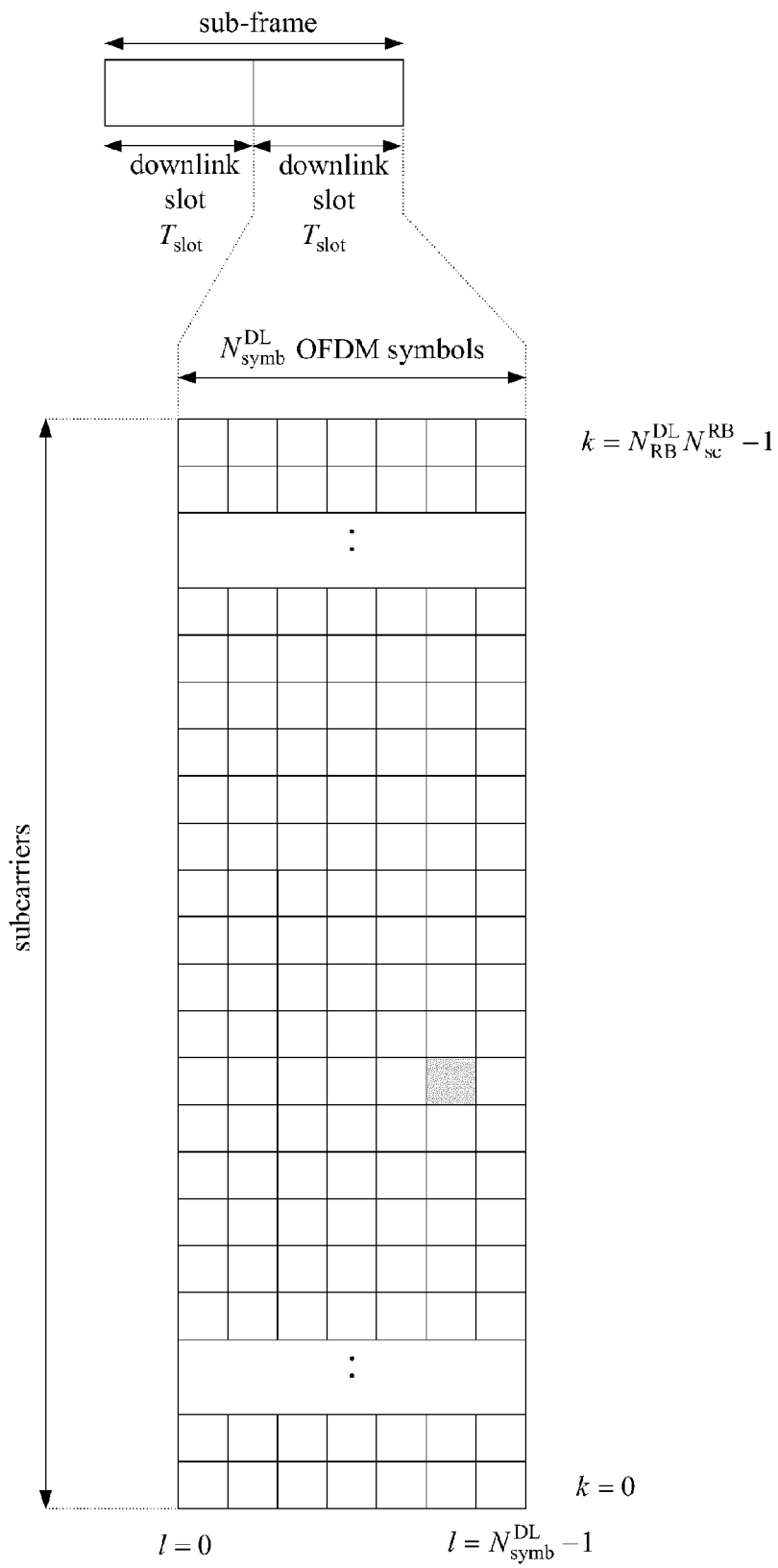
FIG. 3 shows exemplary subframe boundaries on a downlink component carrier as defined for 3GPP LTE (as of Release 8/9)
Figure 4:
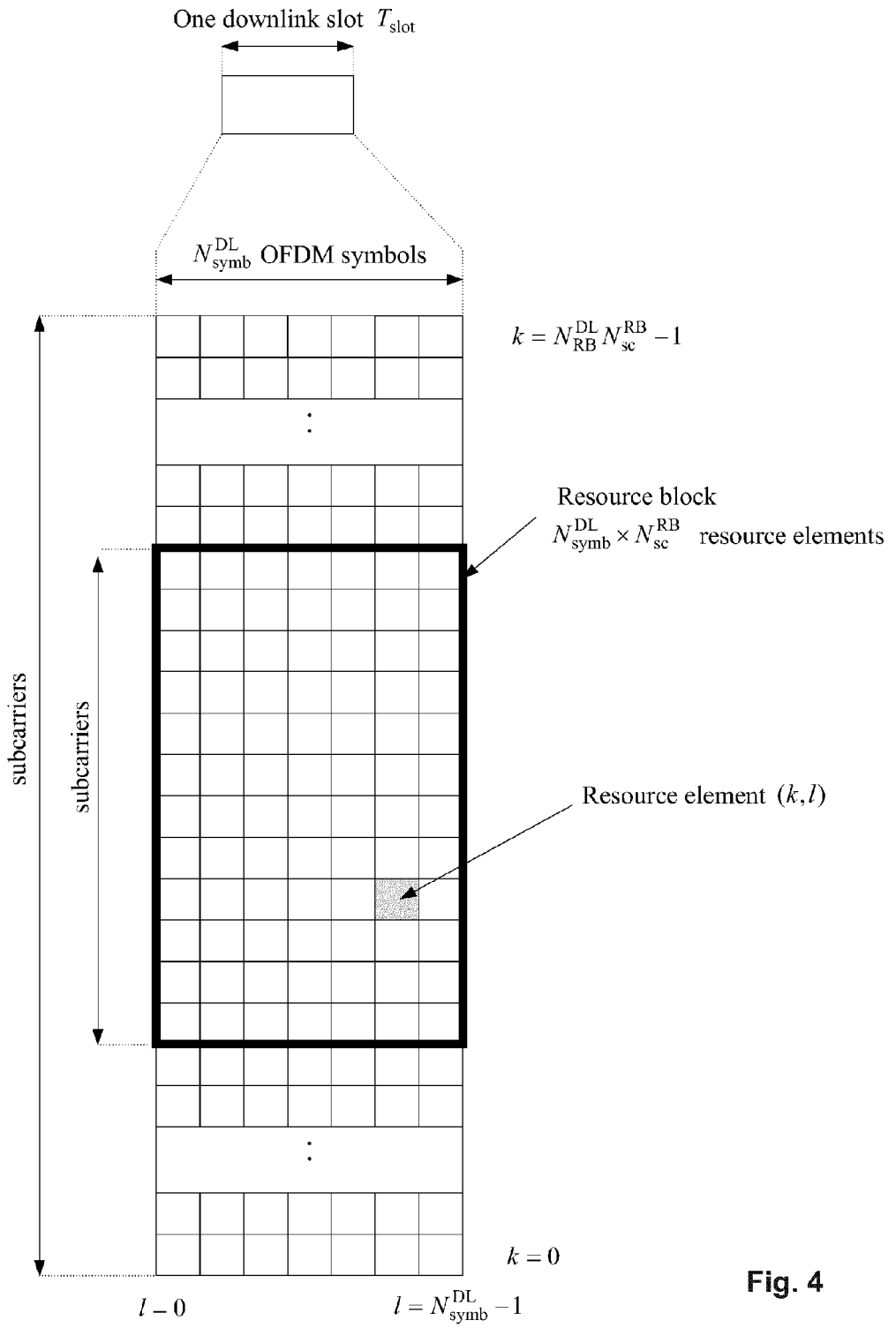
FIG. 4 shows an exemplary downlink resource grid of a downlink slot as defined for 3GPP LTE (as of Release 8/9)
Figure 8:
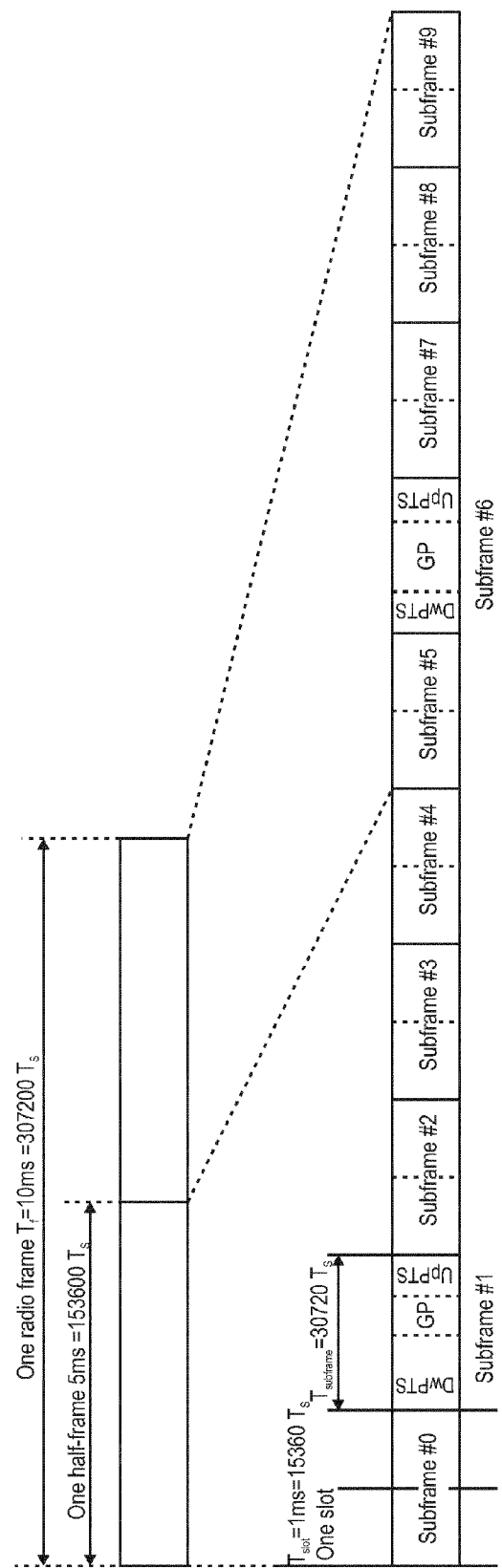
FIG. 8 shows the structure of a radio frame, being composed of two half-frames and 10 subframes, for a 5 ms switch-point periodicity, FIG. 9 identifies an exemplary TDD communication where the radio frame is configured according to UL/DL configuration 1 and the DCI to PUSCH timing relations are defined on the basis of UL/DL configuration 0, FIG. 10 exemplifies a pre-stored association according to a first embodiment of the invention indicating a single timing relation for performing a PUSCH transmission on the basis of the operated UL/DL configuration and of the subframe in which the corresponding DCI transmission is received.
Figure 9:
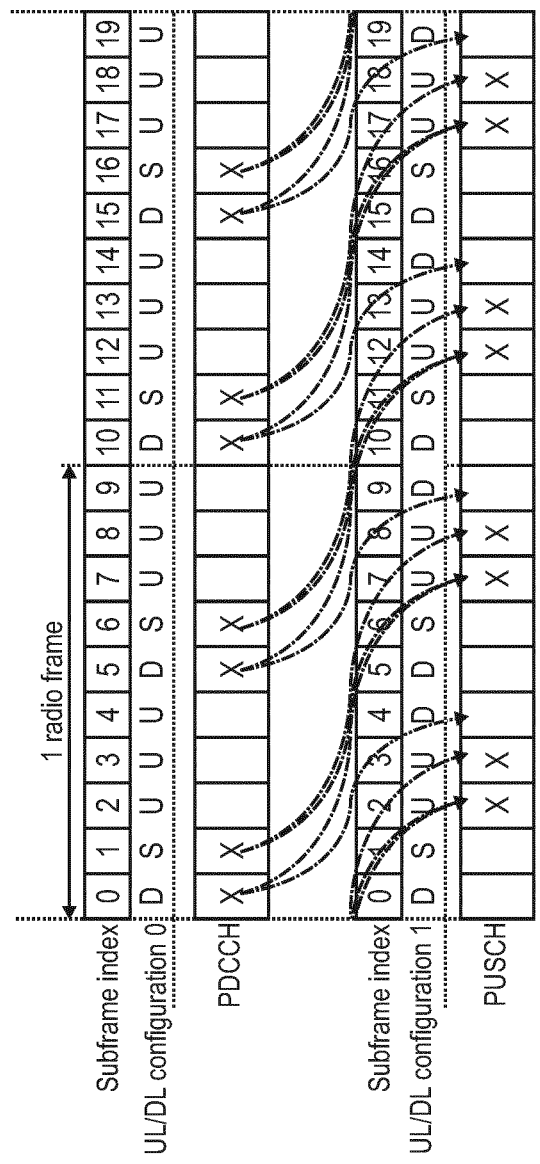

The following paragraphs will describe various embodiments of the invention. For exemplary purposes only, most of the embodiments are outlined in relation to a radio access scheme according to 3GPP LTE (Release 8/9) and LTE-A (Release 10/11/12) mobile communication systems, partly discussed in the Technical Background section above.

It should be noted that the invention may be advantageously used, for example, in a mobile communication system such as 3GPP LTE-A (Release 10/11/12) communication systems as described in the Technical Background section above, but the invention is not limited to its use in this particular exemplary communication networks.

In the context of the invention, the terms "first UL/DL configuration" or "first uplink/downlink configuration" as well as "second UL/DL configuration" or "second uplink/downlink configuration" are used to emphasize the concept of the TDD UL/DL configuration. Nonetheless, it should be clear that the first UL/DL configuration is not an initial configuration with which the mobile station is to be configured for communication with the base station. Similarly, the second UL/DL configuration is not the last UL/DL configuration on the basis of which an uplink reference timing is applied by the mobile station for the communication with the base station.

Specifically, the term "first UL/DL configuration" is used to refer to the "operated UL/DL configuration", namely to the UL/DL configuration according to which the TDD communication is configured, thereby defining the subframes of a radio frame as downlink, uplink, or special subframe. Further, the term "second UL/DL configuration" is used to refer to the "UL HARQ reference configuration", namely the UL/DL configuration on the basis of which the DCI to PUSCH timing relations are defined.

In the context of the invention the term "uplink reference timing relations" is interchangeably used with "DCI to PUSCH timing relations" and has to be construed as defining timing relations (i.e. subframe offsets) indicating when PUSCH transmissions relating to DCI transmissions have to be carried out. Particularly, since PUSCH transmissions require preceding UL grants, the related DCI transmissions, in response to which PUSCH transmissions are carried out, inherently are DCI transmissions carrying an UL grant. In this respect, the DCI transmission, referred to in the invention, are of DCI Format 0 or DCI Format 4.

In the following, several embodiments the invention will be explained in detail. The explanations should not be understood as limiting the invention, but as mere examples of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The various embodiments explained for the invention in general refer to UL/DL configurations and in particular shall provide an improved and a more flexible UL/DL configuration and related mechanisms/processes.

First Embodiment

In connection with the summary of the invention, it has already been emphasized that the various embodiments are based on the concept that the TDD communication may be configured according to a first UL/DL configuration and the DCI to PUSCH timing relations may be based on a different, second UL/DL configuration. In other words, a first UL/DL configuration defines the subframes of a radio frame as an uplink subframe, a downlink subframe or a special subframe for the TDD communication whereas on the basis of a different, second UL/DL configuration the timing relations of PUSCH transmissions in response to DCI transmissions are defined.

In connection with the related art section, the definition of DCI to PUSCH timing relations on the basis of UL/DL configurations has extensively been discussed. Specifically, it has been emphasized that the DCI to PUSCH timing relations are ambiguous with respect to UL/DL configuration 0. In other words, the DCI to PUSCH timing relations on the basis of UL/DL configuration 0 indicate plural subframe offsets for carrying out PUSCH transmissions in response to (i.e. relating to) a single DCI transmission. Accordingly, one or more PUSCH transmissions can be granted by a single DCI transmission. In this respect, it is generally acknowledged that the DCI to PUSCH timing relations on their own do not unambiguously identify a single timing relation for performing a single PUSCH transmission in response to a single DCI transmission.

It has been further explained in the related art section that in case of a TDD communication according to UL/DL configuration 0 the ambiguity is resolved by prescribing particularly formatted DCI transmissions carrying specific information (e.g. uplink index bits). Specifically, for the UL/DL configuration 0 the DCI transmissions are required to comprise an indication (e.g. uplink index bits) for indicating which of the plural subframe offsets in the DCI to PUSCH timing relations is/are to be used. In other words, this indication identifies the timing relation for performing the PUSCH transmission(s) in response to a single DCI transmission.

However, these particularly formatted DCI transmissions are only defined for TDD communication according to UL/DL configuration 0. In other words, in case the TDD communication is configured according to UL/DL configuration 1-6, the DCI transmissions are not in the particular formatting, hence, lacking the indication for indicating which subframe offset in the DCI to PUSCH timing relations to be used. Instead, the DCI transmission includes a Downlink Assignment Index, DAI, in place of the indication (e.g. uplink index bits) for indicating the single timing relation (i.e. subframe offset) to be used.

According to the first embodiment, in addition to the DCI to PUSCH timing relations (i.e. uplink reference timing relations) a supplementary association is defined for indicating, in case of ambiguities in the DCI to PUSCH timing relations, a single timing relation among the plural defined timing relations (i.e. subframe offset) which is to be used for a PUSCH transmission in response to a single DCI transmission. This supplementary association, for indicating the single timing relation to be used, is based on the subframe in which the related DCI transmission is received and on the configured UL/DL configuration.

Since the association is only required in case of ambiguities in the DCI to PUSCH timing relations, the supplementary association is only referred to in case the defined DCI to PUSCH timing relations specify plural timing relations for performing PUSCH transmissions in response to a single DCI transmission.

As shown for instance in FIG. 7, in case the TDD communication is configured according to UL/DL configuration 0, the DCI to PUSCH timing relations define two subframe offsets for alternative or combined PUSCH transmissions in response to a single DCI transmission. In particular, two subframe offsets are defined for plural, different subframes of received DCI transmissions, in response to which a PUSCH transmission is to be performed in UL/DL configuration 0.

For example, in case a DCI transmission is received in subframe 0 and the TDD communication is configured according to UL/DL configuration 0, the DCI to PUSCH timing relations indicate subframe offsets 4 and 7 for alternative or combined PUSCH transmissions in response to same DCI transmission. Accordingly, in this example, the DCI to PUSCH timing relations allow for a PUSCH transmission in subframe 4 (i.e. 0+4) and/or in subframe 7 (i.e. 0+7) for TDD communication according to second UL/DL configuration 0. Similarly, for DCI transmissions in subframes 1, 5 and 6, the DCI to PUSCH timing relations indicate two subframe offsets for alternative or combined PUSCH transmissions.

Consequently, the exemplary association is only referred to in case the DCI to PUSCH timing relations are defined on the basis of second UL/DL configuration 0, which ambiguously defines subframe offsets for PUSCH transmissions in response to DCI transmission.

Additionally, for the association of the first embodiment to be referred to, the first UL/DL configuration, according to which the TDD communication is configured, must be different from the second UL/DL configuration, on the basis of which the DCI to PUSCH timing relations are defined. Under this assumption, the first UL/DL configuration specifies the subframes of a radio frame differently from the applied DCI to PUSCH timing relations such that the association is required to ensure compliance with the configured TDD communication.

For example, even if the TDD communication is configured according to UL/DL configuration 1, the DCI to PUSCH timing relations based on UL/DL configuration 0 would allow for a PUSCH transmission in subframe 0+4, namely in response to a received DCI transmission in subframe 0 and a subframe offset 4. However, in subframe 4 (i.e. 0+4) a PUSCH transmission cannot be performed because the UL/DL configuration 1 defines subframe 4 as a downlink subframe and hence does not enable uplink transmissions.

In more detail, for avoiding ambiguities in the DCI to PUSCH timing relations, the association is adapted to indicate only those among the plural timing relations which, in response to the subframe in which the DCI transmission is received, allow for PUSCH transmission, i.e. which identify a subframe which is defined as an uplink subframe in the first UL/DL configuration. In other words, for providing a single (e.g. unambiguous) timing relation (i.e. subframe offset) on the basis of which a PUSCH transmission can be performed, the association excludes those among the plurality of timing relations which are not defined as uplink subframes in the first UL/DL configuration. For example, as shown in FIG. 10, the excluded timing relations may be referred to as N/A and are marked with a hatching.

In the example of the first embodiment, for the association to be referred to, the first TDD communication must be configured according to one of UL/DL configurations 1-6, i.e. which is different from second UL/DL configuration 0.

To the skilled reader, it is pointed out that the association is limited to the subframe offsets (i.e. timing relations) that are pre-defined among the DCI to PUSCH timing relations. In other words, the pre-defined DCI to PUSCH timing relations are maintained unchanged for TDD communication, such that the DCI to PUSCH timing relations remain pre-defined on the basis of the UL/DL configuration 0. In this respect, the association only indicates a single timing relation among plural timing relations which are pre-defined by the DCI to PUSCH timing relations.

In this respect, situations may theoretically occur in which none of the pre-defined plural subframe offsets identify a subframe in which a PUSCH transmission can be performed in response to a DCI transmission. However, these situations can be excluded in practice since the base station may avoid scheduling DCI transmissions in subframes in which none of the pre-defined plural subframe offsets identify a subframe in which a corresponding PSUCH transmission can be performed.

An exemplary association according to the first embodiment is shown, for example, in FIG. 10. In particular, the exemplary association includes an indication of a single timing relation that is to be used for a PUSCH transmission. Specifically, the association indicates a single timing relation for each of the subframes, in which a corresponding DCI transmission can be received and for each of the plurality of UL/DL configurations, according to which the TDD communication can be configured.

In more detail, the association includes an indication of the single timing relation in form of two uplink index bits (also termed UL index bits). In case the uplink index bits have the value (1, 0), the left bit being the most significant bit (i.e. MSB) and the right bit being the least significant bit (i.e. LSB), the first (i.e. left) of the two subframe offsets defined in the DCI to PUSCH timing relations is used for performing the PUSCH transmission. Similarly, in case the uplink index bits have the value (0, 1), the second (i.e. right) of the two subframe offsets defined in the DCI to PUSCH timing relations is used for performing the PUSCH transmission. It may be noted that the second of the two subframe offsets currently defined, where applicable, is always defined as k=7.

In general, it is important to note that the uplink index bits are not part of the DCI transmission. Instead, the uplink index bits are part of the pre-stored association and, hence, are referred to for determining the single timing relation among the plural timing relations of the DCI to PUSCH timing relations. Moreover, the pre-stored association shall be understood as assuming uplink index bits of a specific value which have not been communicated but have been determined based on the first UL/DL configuration and on the subframe in which the corresponding DCI transmission is received.

Consequently, the pre-stored association results in a behavior which is similar to the implementation discussed in the background section, i.e. where uplink index bits of a corresponding value are included in the DCI transmission and then used for determining the single timing relation among the DCI to PUSCH timing relations.

In this connection, it can be readily appreciated that even though the two uplink index bits may have 4 different values, the association according to this embodiment only includes uplink index bits of two different values which are directly associated with different subframe offsets. In this respect, the association indicates a single timing relation (i.e. subframe offset) among the plural timing relation defined by the DCI to PUSCH timing relations for performing a PUSCH transmission in response to a DCI transmission.

Further, since the underlying concept allows different UL/DL configurations: a first UL/DL configuration for the TDD communication thereby defining the subframes in the radio frame and a second UL/DL configuration for the DCI to PUSCH timing relations thereby defining the subframe offsets of PUSCH transmissions in response to DCI transmissions, the association also includes combinations for which none of the pre-defined subframe offsets of the DCI to PUSCH timing relations specify a subframe defined as uplink subframe for a corresponding PUSCH transmission. These combinations are indicated in FIG. 10 marked with a hatching.

For example, in case second UL/DL configuration is UL/DL configuration 0 (the association is only referred to for UL/DL configuration 0) and in case the first UL/DL configuration is UL/DL configuration 3, should a DCI transmission be received in subframe 0, the corresponding single timing relation for the PUSCH transmission in response to the DCI transmission is indicated by uplink index bits with the value (1, 0). The uplink index bits with the value (1, 0) indicate that the first (i.e. left) of the subframe offsets 4 and 7 defined for the DCI transmission in subframe 0 by the DCI to PUSCH timing relations on the basis of UL/DL configuration 0 is to be used for performing the PUSCH transmission. Accordingly, a PUSCH transmission is to be performed in subframe 0+4 which is defined as uplink subframe by the UL/DL configuration 3 according to which the TDD communication is configured.

As a further example, in case the second UL/DL configuration is UL/DL configuration 0 and in case the first UL/DL configuration is 3, the uplink index bits for a potential DCI transmission in subframe 1 are marked with a hatching as either one of the two subframe offsets 6 and 7 of the DCI to PUSCH timing relations defined on the basis of UL/DL configuration 0 indicates a subframe 7 (i.e. 1+6) or subframe 8 (i.e. 1+7) which are both defined as downlink subframes by UL/DL configuration 3 and hence cannot be used for performing a PUSCH transmission in response to this potential DCI transmission. Nevertheless, in this example uplink index bits are defined for the potential DCI transmission in subframe 3 for consistency reasons.

As can be seen from FIG. 10, there may be cases where a subframe, that is able to transmit PUSCH-assigning DCI is not showing a corresponding uplink index bit assumption (or is showing N/A for not applicable), e.g. for a DCI transmission in subframe n=1 for UL/DL configuration 3. As other subframes provide sufficient opportunities to unambiguously assign uplink transmissions in the subframes configured for uplink transmissions according to the first UL/DL configuration, it is not necessary to define an additional timing relation for DCI transmitted in such a subframe. Therefore, the receiver would preferably ignore any PUSCH-assigning DCI in such a subframe in order to avoid undefined behavior and/or creating undesired PUSCH transmissions in case of a false DCI detection.

First Example of the First Embodiment

Figure 11A:
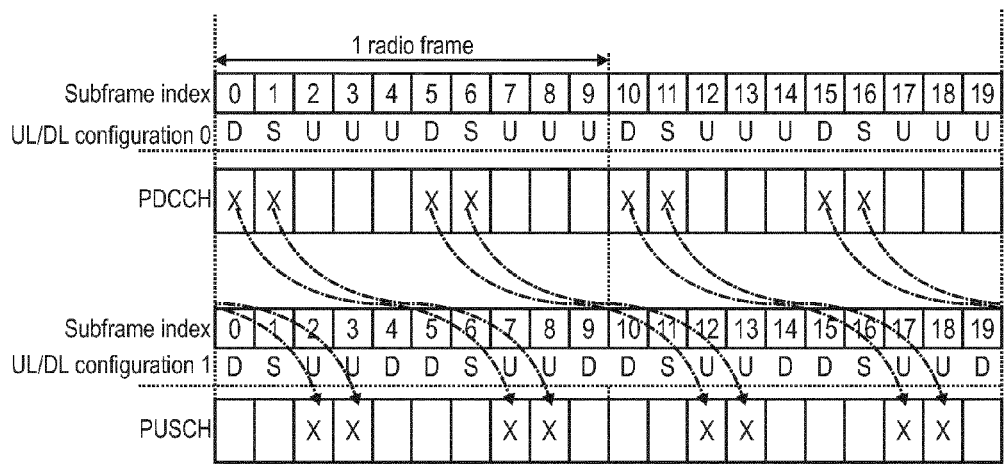
FIGS. 11a-f illustrate examples of TDD communication employing the pre-stored association according to the first embodiment where the radio frame is configured according to UL/DL configuration 1-6 and the DCI to PUSCH timing relations are defined on the basis of UL/DL configuration 0.

According to a more detailed example of the first embodiment, the first UL/DL configuration is assumed to be UL/DL configuration 1 and the second UL/DL configuration is assumed to be UL/DL configuration 0. This example is illustrated in FIG. 11a.

Specifically, the first UL/DL configuration defines the subframes of a radio frame as an uplink subframe, a downlink subframe or a special subframe. The first UL/DL configuration is illustrated in connection with the Physical Uplink Shared Channel, PUSCH in the bottom row of FIG. 11a.

Further, on the basis of the second UL/DL configuration, the DCI to PUSCH timing relations (i.e. uplink reference timing relations) are defined. The DCI to PUSCH timing relations define one or plural timing relation(s) for performing one or plural PUSCH transmission(s) in response to a single DCI transmission. The DCI to PUSCH timing relations are indicated as dash-dotted arrows in FIG. 11a.

In this more detailed example of the first embodiment, the pre-stored association is referred to for determining a single timing relation for a PUSCH transmission in response to the subframe in which the corresponding DCI transmission is received, and where the DCI for assigning UL transmissions does not contain UL Index bits but does contain DAI bits.

Specifically, in case a DCI transmission is received in subframe 0, the corresponding PUSCH transmission is performed in subframe 7 (i.e. 0+7) because the pre-stored association assumes uplink index bits of value (0, 1), thereby determining the single timing relation (i.e. subframe offset) to be 7 among the plural timing relation 4 and 7 of the DCI to PUSCH timing relations.

Similarly, in case a DCI transmission is received in subframe 1, the corresponding PUSCH transmission is performed in subframe 8 (i.e. 1+7) because the pre-stored association assumes uplink index bits of value (0, 1), thereby determining the single timing relation (i.e. subframe offset) to be 7 among the plural timing relations 6 and 7 of the DCI to PUSCH timing relations.

Further, in case a DCI transmission is received in subframe 5 and 6, the corresponding PUSCH transmission is performed in subframe 12 (i.e. 5+7) and 13 (i.e. 6+7), respectively. The subframes 12 and 13 correspond to the subframes 2 and 3 of the subsequent radio frame. The PUSCH transmissions are shown in FIG. 11a as uplink subframe of the respective number to which a corresponding dash-dotted arrow is pointed.

Second Example of the First Embodiment

Figure 11B:
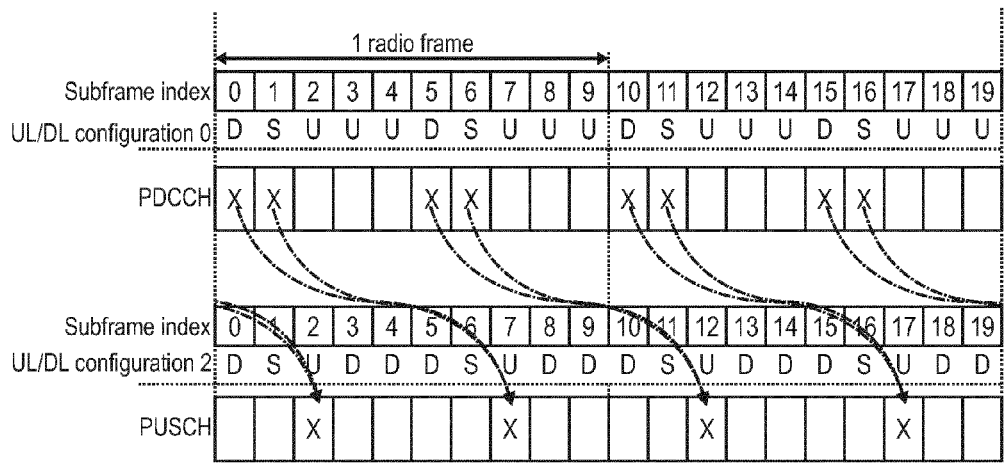

According to another more detailed example of the first embodiment, the first UL/DL configuration is assumed to be UL/DL configuration 2 and the second UL/DL configuration is assumed to be UL/DL configuration 0. This example is illustrated in FIG. 11b.

Also in this more detailed example of the first embodiment, the pre-stored association is referred to for determining a single timing relation for a PUSCH transmission in response to the subframe in which the corresponding DCI transmission is received, and the DCI for assigning UL transmissions does not contain UL Index bits but does contain DAI bits.

Specifically, in case a DCI transmission is received in subframe 0, the corresponding PUSCH transmission is performed in subframe 7 (i.e. 0+7) because the pre-stored association assumes uplink index bits of value (0, 1), thereby determining the single timing relation (i.e. subframe offset) to be 7 among the plural timing relation 4 and 7 of the DCI to PUSCH timing relations.

Similarly, in case a DCI transmission is received in subframe 1, the corresponding PUSCH transmission is also performed in subframe 7 (i.e. 1+6) because the pre-stored association assumes uplink index bits of value (1, 0), thereby determining the single timing relation (i.e. subframe offset) to be 6 among the plural timing relations 6 and 7 of the DCI to PUSCH timing relations.

Further, in case a DCI transmission is received in subframe 5 and 6, the corresponding PUSCH transmission is performed in subframe 12 (i.e. 5+7) and 12 (i.e. 6+6), respectively. The subframes 12 and 13 correspond to the subframes 2 and 3 of the subsequent radio frame.

Third Example of the First Embodiment

Figure 11C:
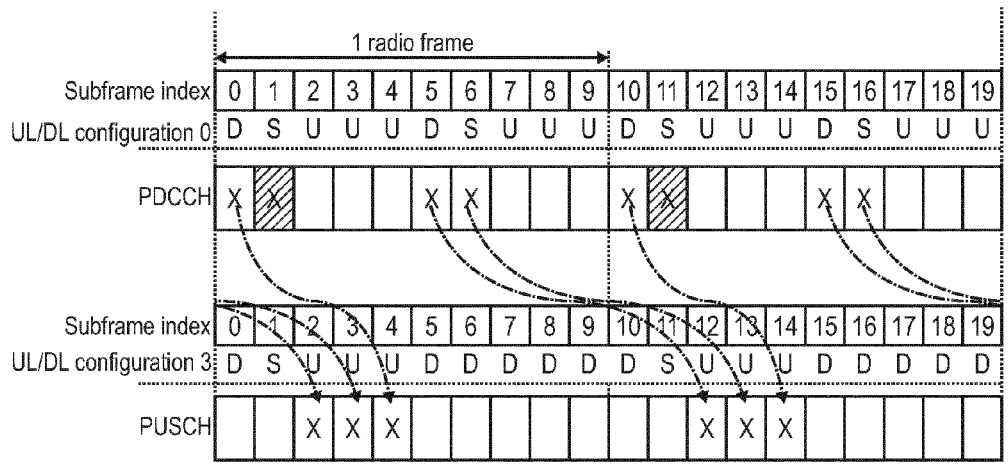

According to another more detailed example of the first embodiment, the first UL/DL configuration is assumed to be UL/DL configuration 3 and the second UL/DL configuration is assumed to be UL/DL configuration 0. This example is illustrated in FIG. 11c.

Also in this more detailed example of the first embodiment, the pre-stored association is referred to for determining a single timing relation for a PUSCH transmission in response to the subframe in which the corresponding DCI transmission is received, and the DCI for assigning UL transmissions does not contain UL Index bits but does contain DAI bits.

Specifically, in case a DCI transmission is received in subframe 0, the corresponding PUSCH transmission is performed in subframe 4 (i.e. 0+4) because the pre-stored association assumes uplink index bits of value (1, 0), thereby determining the single timing relation (i.e. subframe offset) to be 4 among the plural timing relation 4 and 7 of the DCI to PUSCH timing relations.

Similarly, in case a DCI transmission is received in subframe 5, the corresponding PUSCH transmission is also performed in subframe 12 (i.e. 5+7) because the pre-stored association assumes uplink index bits of value (0, 1), thereby determining the single timing relation (i.e. subframe offset) to be 7 among the plural timing relations 6 and 7 of the DCI to PUSCH timing relations.

Further, in case a DCI transmission is received in subframe 6, the corresponding PUSCH transmission is performed in subframe 13 (i.e. 6+7). The subframe 13 corresponds to the subframes 3 of the subsequent radio frame. Moreover, the PDCCH subframe 1 is marked with a hatching because neither of the plural timing relations 6 and 7 of the DCI to PUSCH timing relations refers to an uplink subframe which allows for a corresponding PUSCH transmission.

Therefore, the receiver would preferably ignore any PUSCH-assigning DCI in subframe 1 in order to avoid undefined behavior and/or creating undesired PUSCH transmissions in case of a false DCI detection.

Fourth Example of the First Embodiment

Figure 11D:
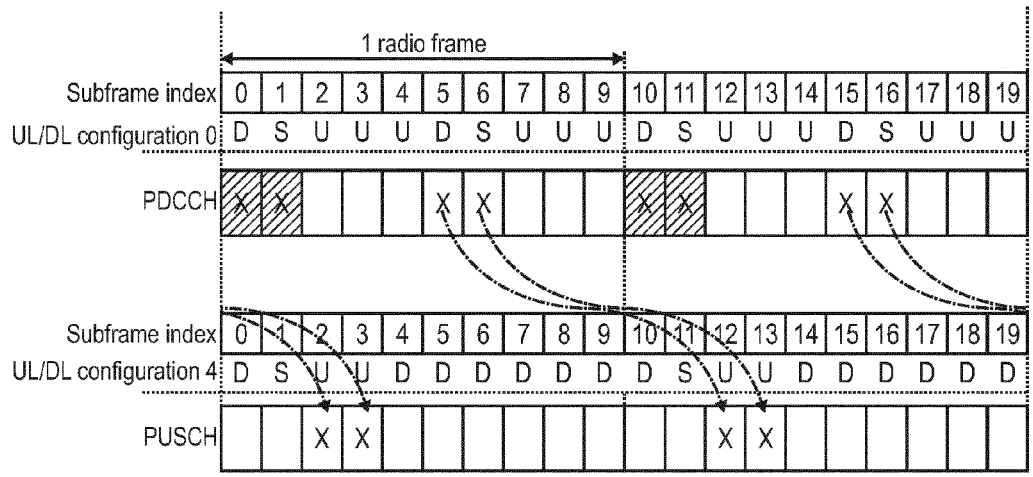

According to a further more detailed example of the first embodiment, the first UL/DL configuration is assumed to be UL/DL configuration 4 and the second UL/DL configuration is assumed to be UL/DL configuration 0. This example is illustrated in FIG. 11d.

Also in this more detailed example of the first embodiment, the pre-stored association is referred to for determining a single timing relation for a PUSCH transmission in response to the subframe in which the corresponding DCI transmission is received, and the DCI for assigning UL transmissions does not contain UL Index bits but does contain DAI bits.

Specifically, in case a DCI transmission is received in subframe 5, the corresponding PUSCH transmission is performed in subframe 12 (i.e. 5+7) because the pre-stored association assumes uplink index bits of value (0, 1), thereby determining the single timing relation (i.e. subframe offset) to be 7 among the plural timing relation 6 and 7 of the DCI to PUSCH timing relations.

Similarly, in case a DCI transmission is received in subframe 6, the corresponding PUSCH transmission is also performed in subframe 13 (i.e. 6+7) because the pre-stored association assumes uplink index bits of value (0, 1), thereby determining the single timing relation (i.e. subframe offset) to be 7 among the plural timing relations 6 and 7 of the DCI to PUSCH timing relations.

Further, the PDCCH subframes 0 and 1 are marked with a hatching because neither of the plural timing relations 4 and 7 or 6 and 7 of the respective DCI to PUSCH timing relations refer to an uplink subframe which allows for a corresponding PUSCH transmission. Therefore, the receiver would preferably ignore any PUSCH-assigning DCI in subframes 0 and 1 in order to avoid undefined behavior and/or creating undesired PUSCH transmissions in case of a false DCI detection.

Fifth Example of the First Embodiment

Figure 11E:
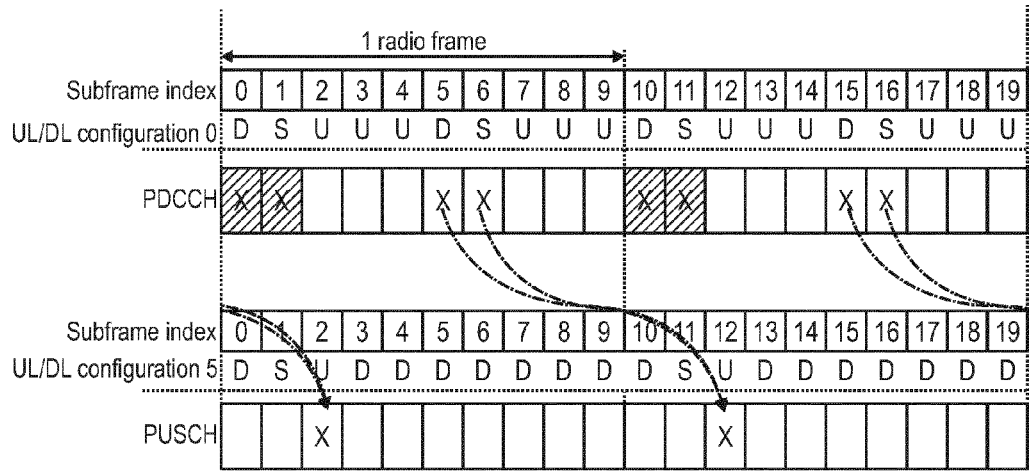

According to yet another more detailed example of the first embodiment, the first UL/DL configuration is assumed to be UL/DL configuration 5 and the second UL/DL configuration is assumed to be UL/DL configuration 0. This example is illustrated in FIG. 11e.

Also in this more detailed example of the first embodiment, the pre-stored association is referred to for determining a single timing relation for a PUSCH transmission in response to the subframe in which the corresponding DCI transmission is received, and the DCI for assigning UL transmissions does not contain UL Index bits but does contain DAI bits.

Specifically, in case a DCI transmission is received in subframe 5, the corresponding PUSCH transmission is performed in subframe 12 (i.e. 5+7) because the pre-stored association assumes uplink index bits of value (0, 1), thereby determining the single timing relation (i.e. subframe offset) to be 7 among the plural timing relation 6 and 7 of the DCI to PUSCH timing relations.

Similarly, in case a DCI transmission is received in subframe 6, the corresponding PUSCH transmission is also performed in subframe 12 (i.e. 6+6) because the pre-stored association assumes uplink index bits of value (1, 0), thereby determining the single timing relation (i.e. subframe offset) to be 6 among the plural timing relations 6 and 7 of the DCI to PUSCH timing relations.

Further, the PDCCH subframes 0 and 1 are marked with a hatching because neither of the plural timing relations 4 and 7 or 6 and 7 of the respective DCI to PUSCH timing relations refer to an uplink subframe which allows for a corresponding PUSCH transmission. Therefore, the receiver would preferably ignore any PUSCH-assigning DCI in subframes 0 and 1 in order to avoid undefined behavior and/or creating undesired PUSCH transmissions in case of a false DCI detection.

Sixth Example of the First Embodiment

Figure 11F:
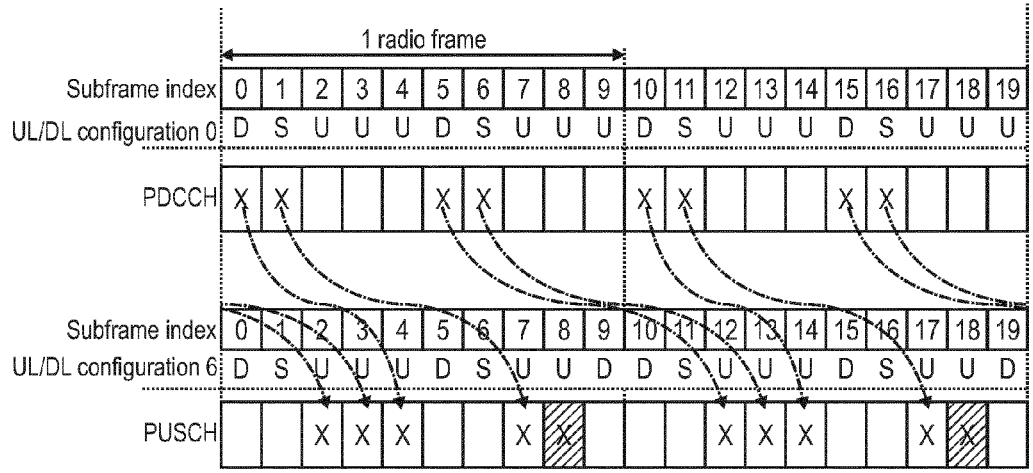
Figure 12:
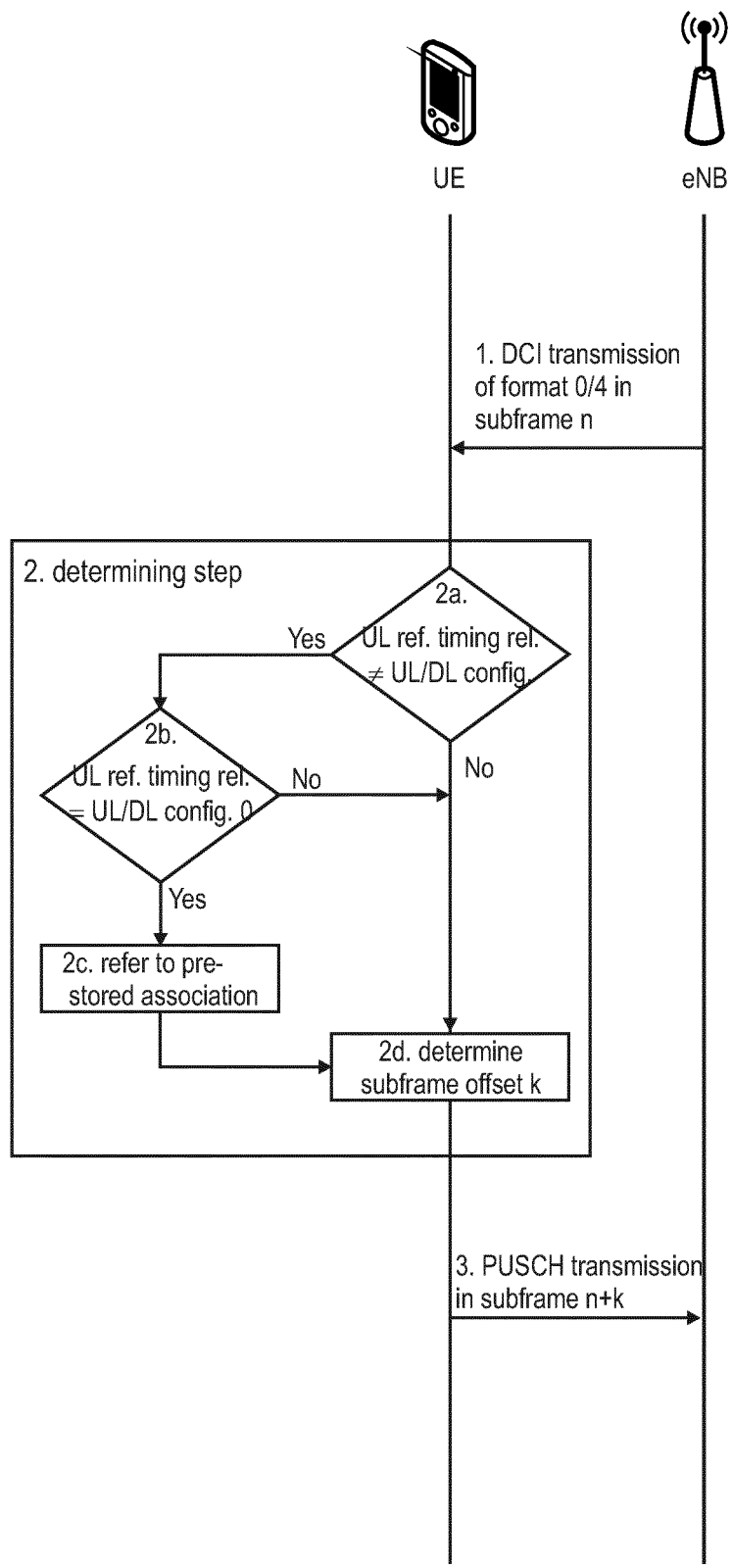
FIG. 12 shows an exemplary operation of a mobile station making use of the pre-stored association according to the first embodiment of the invention, and FIG. 13 exemplifies another pre-stored association according to a second embodiment of the invention indicating a single timing relation for performing a PUSCH transmission on the basis of the subframe in which the corresponding DCI transmission is received.

According to yet another more detailed example of the first embodiment, the first UL/DL configuration is assumed to be UL/DL configuration 6 and the second UL/DL configuration is assumed to be UL/DL configuration 0. This example is illustrated in FIG. 11f.

Also in this more detailed example of the first embodiment, the pre-stored association is referred to for determining a single timing relation for a PUSCH transmission in response to the subframe in which the corresponding DCI transmission is received, and the DCI for assigning UL transmissions does not contain UL Index bits but does contain DAI bits.

Specifically, in case a DCI transmission is received in subframe 0, the corresponding PUSCH transmission is performed in subframe 4 (i.e. 0+4) because the pre-stored association assumes uplink index bits of value (1, 0), thereby determining the single timing relation (i.e. subframe offset) to be 4 among the plural timing relation 4 and 7 of the DCI to PUSCH timing relations.

Similarly, in case a DCI transmission is received in subframe 1, the corresponding PUSCH transmission is performed in subframe 7 (i.e. 1+6) because the pre-stored association assumes uplink index bits of value (1, 0), thereby determining the single timing relation (i.e. subframe offset) to be 6 among the plural timing relations 6 and 7 of the DCI to PUSCH timing relations.

Further, in case a DCI transmission is received in subframe 5 and 6, the corresponding PUSCH transmission is performed in subframe 12 (i.e. 5+7) and 13 (i.e. 6+7), respectively. The subframes 12 and 13 correspond to the subframes 2 and 3 of the subsequent radio frame.

Moreover this detailed example results in the loss of a PUSCH transmission in subframe 8 which is also defined as an uplink subframe by UL/DL configuration 6. However, this loss is linked to concept of the pre-stored association. Since the DCI to PUSCH timing relations are based on the UL/DL configuration 0, the pre-stored association only allows indicating four separate subframe offsets for performing a PUSCH transmission in response to a single DCI transmission. Consequently, the scheduling opportunity for a fifth PUSCH transmission in subframe 8 is lost.

In general, subframe 8 is considered the least attractive subframe for scheduling a PUSCH transmission. Consequently, the above detailed example can be considered advantageous over alternatives enabling PUSCH transmissions to be performed in subframe 8.

Firstly, a PUSCH transmission in subframe 8 introduces a considerable amount of scheduling delay (i.e. subframe offset 7). Further, a PUSCH transmission in subframe 8 is prone to uplink downlink interference. Specifically, subframe 8 is defined as uplink subframe by UL/DL configuration 6 and directly precedes subframe 9 which is defined as downlink subframe by UL/DL configuration 6. In this respect, uplink downlink interference may be caused by a PUSCH transmission in subframe 8 that spills into subframe 9.

Nevertheless, according to a variation of the first embodiment, in case the first UL/DL configuration is UL/DL configuration 6 and the second UL/DL configuration is UL/DL configuration 0, a semi static uplink index bit configuration may be used according to which the DCI transmission in subframe 1 may include a single bit for indicating whether the corresponding PUSCH transmission is to be performed in subframe 7 (i.e. 1+6) or 8 (i.e. 1+7). In this respect the single bit would set the assumed two uplink index bits to either (1, 0) or (0, 1), thereby determining the single timing relation (i.e. subframe offset) to be either 6 or 7 among the plural timing relations 6 and 7 of the DCI to PUSCH timing relations, respectively.

According to another variation of the first embodiment, in case the first UL/DL configuration is UL/DL configuration 6 and the second UL/DL configuration is UL/DL configuration 0, at least one association between the DCI transmission and corresponding PUSCH transmission is configurable, preferably semi-statically using e.g. RRC signaling. For example, such a semi-static parameter determines whether a DCI transmission in subframe 1 corresponds to a PUSCH transmission to be performed in subframe 7 (i.e. 1+6) or in 8 (i.e. 1+7). In this respect the semi-static parameter would set the assumed two uplink index bits to either (1, 0) or (0, 1), thereby determining the single timing relation (i.e. subframe offset) to be either 6 or 7 among the plural timing relations 6 and 7 of the DCI to PUSCH timing relations, respectively. This variation can equally be extended to first UL/DL configurations other than 6 in order to allow a more flexible scheduler implementation, and potentially establishing timing relations with a smaller delay at the potential cost of fewer assignable PUSCH transmissions and the cost of implementing and testing the configurability and its correct behavior.

Operation of the Mobile Station According to the First Embodiment

According to the first embodiment, a mobile station performs a PUSCH transmission in response to a DCI transmission. In this context, the mobile station is assumed to utilize a Time Division Duplex, TDD, communication scheme for communicating with a base station in a communication system. The TDD communication is based on at least one of a plurality of pre-defined UL/DL configurations.

Specifically, the mobile station is configured according to a first of the plurality of UL/DL configurations. Each of the plurality of UL/DL configurations defines the subframes of a radio frame as an uplink subframe, a downlink subframe or a special subframe. Further, the mobile station applies DCI to PUSCH timing relations on the basis of a second of the plurality UL/DL configurations. The DCI to PUSCH timing relations define one or plural timing relation(s) for performing one or plural PUSCH transmission(s) in response to a single DCI transmission.

In this context, in step 1, the mobile station receives in a subframe n a DCI transmission in response to which a PUSCH transmission is to be performed. Particularly, since the reception of the DCI transmission triggers the mobile station to perform a PUSCH transmission, the DCI transmission is carrying an uplink grant, i.e. the DCI transmission is of Format 0/4. The subframe n, in which the DCI transmission is received, is defined as downlink subframe or special subframe by the first UL/DL configuration.

Subsequently, in step 2, the mobile station, by applying the DCI to PUSCH timing relations, determines a single timing relation k for a PUSCH transmission according to the subframe n in which the corresponding DCI transmission is received.

As part of this step 2, the mobile station determines, in step 2a, if the first UL/DL configuration, according to which the communication is configured, is different from the second UL/DL configuration, on the basis of which the DCI to PUSCH timing relations are defined.

In case the first and the second UL/DL configuration are different from each other (i.e. "yes" in step 2a), the mobile station further determines, in step 2b, if the DCI to PUSCH timing relations specifies single or plural timing relations for performing PUSCH transmission in response to a single DCI transmission. Alternatively, the mobile station may determine if the DCI to PUSCH timing relations are specified on the basis of UL/DL configuration 0 or not.

In case of a further positive determination result (i.e. "yes" in step 2b) the mobile station knows that no uplink index bits are available in the DCI transmission and refers, as part of the determining step, to a pre-stored association. Only in this case, the DCI to PUSCH timing relations are ambiguous such that the mobile station requires additional information in form of the pre-stored association in order to determine a single timing relation for performing the PUSCH transmission.

Should, for instance, the determination result in step 2b be negative (i.e. "no" in step 2b), it can be readily appreciated that the DCI to PUSCH timing relations unambiguously define a single timing relation for performing the PUSCH transmission such that the mobile station requires no additional information in the form of the pre-stored association or uplink index bits in the DCI transmission. In other words, even though the second UL/DL configuration, on the basis of which the DCI to PUSCH timing relation is defined, differs from the configured first UL/DL configuration, the mere knowledge that the mobile station is applying this DCI to PUSCH timing relations suffices in identifying a single timing relation in which the PUSCH transmission is to be performed.

Further, should, for instance, the determination result in step 2a be negative (i.e. "no" in step 2a), it can be readily appreciated that the DCI to PUSCH timing relations are unambiguous in case one of UL/DL configurations 1-6 is being operated, or in case of the DCI to PUSCH timing relation for a specific uplink assigning DCI can be unambiguously determined by means of the uplink index bits included in the DCI in case of operating UL/DL configuration 0, by determining whether e.g. the first, second, or both offsets should be applied to determine the assigned uplink subframe(s).

Where referred to, the pre-stored association indicates the single timing relation k among the plural timing relations that is to be used for the PUSCH transmission based on the subframe n in which the corresponding DCI transmission is received and on the first UL/DL configuration according to which the communication with the base station is configured.

Subsequently, the mobile station performs, in step 3, the PUSCH transmission in the single subframe n+k defined as an uplink subframe by the first uplink/downlink configuration. The uplink subframe n+k corresponds to the determined single timing relation k.

Second Embodiment

According to a second embodiment, a pre-stored association is defined for indicating, in case of ambiguities in the DCI to PUSCH timing relations, a single timing relation among the plural defined timing relations (i.e. subframe offset) which is to be used for a PUSCH transmission in response to a single DCI transmission. This association is based on the subframe in which the related DCI transmission is received.

Since the association is only required in case of ambiguities in the DCI to PUSCH timing relations when the DCI does not provide means to resolve these ambiguities, the association of this embodiment is only referred to, in case the first UL/DL configuration, according to which the TDD communication is configured, is different from the second UL/DL configuration, on the basis of which the DCI to PUSCH timing relations are defined and in case the defined DCI to PUSCH timing relations specify plural timing relations for performing PUSCH transmissions in response to a single DCI transmission. The case where the DCI to PUSCH timing relations specify plural timing relations may be considered equivalent to the case where the second UL/DL configuration is UL/DL configuration 0.

In the example of the second embodiment, for the association to be referred to, the first TDD communication must be configured according to one of UL/DL configurations 1-6, i.e. which is different from second UL/DL configuration 0.

To the skilled reader, it is pointed out that the association is limited to subframe offsets (i.e. timing relations) that are pre-defined among the DCI to PUSCH timing relations. In other words, the pre-defined DCI to PUSCH timing relations are maintained unchanged for TDD communication, such that the DCI to PUSCH timing relations remain pre-defined on the basis of the UL/DL configuration 0 exemplarily shown in FIG. 7. In this respect, the association only indicates a single timing relation among plural timing relations which are pre-defined by the DCI to PUSCH timing relations.

An exemplary association according to the second embodiment is shown, for example, in FIG. 13. In particular, the exemplary association includes an indication of a single timing relation that is to be used for a PUSCH transmission. Specifically, the association indicates a single timing relation for each of the subframes, in which a corresponding DCI transmission can be received.

In more detail, the association includes an indication of the single timing relation in form of two uplink index bits (also termed UL index bits). In case the uplink index bits have the value (1, 0), the left bit being the most significant bit (i.e. MSB) and the right bit being the least significant bit (i.e. LSB), the first (i.e. left) of the two subframe offsets defined in the DCI to PUSCH timing relations is used for performing the PUSCH transmission. Similarly, in case the uplink index bits have the value (0, 1), the second (i.e. right) of the two subframe offsets defined in the DCI to PUSCH timing relations is used for performing the PUSCH transmission. It may be noted that the second of the two subframe offsets currently defined, where applicable, is always defined as k=7.

Specifically, for subframes 0 and 1, in which a corresponding DCI transmission can be received, the association indicates the single timing relation for the PUSCH transmission by uplink index bits with the value (1, 0). For subframes 5 and 6, in which a corresponding DCI transmission can be received, the association indicates the single timing relation for the PUSCH transmission by uplink index bits with the value (0, 1).

Consequently, even though the embodiment is applicable only under certain conditions as outlined above, the association itself of this embodiment is defined independent of the first and second UL/DL configuration and allows indicating the a timing relation identifying subframes 4, 7, 12 and 13 for performing the PUSCH transmission irrespective of whether same subframes are defined or are not defined as uplink subframe by the first UL/DL configuration.

In general, it is important to note that the uplink index bits are not part of the DCI transmission. Instead, the uplink index bits are part of the pre-stored association and, hence, are referred to for determining the single timing relation among the plural timing relations of the DCI to PUSCH timing relations. Moreover, the pre-stored association shall be understood as assuming uplink index bits of a specific value which have not been communicated but have been determined based on, for instance, the subframe in which the corresponding DCI transmission is received.

Consequently, the pre-stored association results in a behavior which is similar to the implementation discussed in the background section, i.e. where uplink index bits of a corresponding value are included in the DCI transmission and then used for determining the single timing relation among the DCI to PUSCH timing relations.

In this connection, it can be readily appreciated that even though the two uplink index bits may have 4 different values, the association according to this embodiment only includes uplink index bits of two different values which are directly associated with different subframe offsets. In this respect, the association indicates a single timing relation (i.e. subframe offset) among the plural timing relation defined by the DCI to PUSCH timing relations for performing a PUSCH transmission in response to a DCI transmission.

For example, in case second UL/DL configuration is UL/DL configuration 0 and in case the first UL/DL configuration is the different UL/DL configuration 3, should a DCI transmission be received in subframe 0, the corresponding single timing relation for the PUSCH transmission in response to the DCI transmission is indicated by uplink index bits with the value (1, 0). The uplink index bits with the value (1, 0) indicate that the first (i.e. left) of the subframe offsets 4 and 7 defined for the DCI transmission in subframe 0 by the DCI to PUSCH timing relations on the basis of UL/DL configuration 0 is to be used for performing the PUSCH transmission. Accordingly, a PUSCH transmission is to be performed in subframe 4 (i.e. 0+4) which is defined as uplink subframe by the UL/DL configuration 3 according to which the operating TDD communication is configured.

Consequently, the association defined in the second embodiment, at least in part, corresponds to the association defined in the first embodiment. In this respect, the complexity of determining a single timing relation among the plural timing relations of the DCI to PUSCH timing relations reduces with respect to the first embodiment. However, with this beneficial reduction in complexity also the flexibility for performing the corresponding PUSCH transmission decreases since only in case of UL/DL configurations 3, 4 and 6 as the first UL/DL configuration an optimal utilization of the defined uplink subframes is possible.

Specifically, in case of UL/DL configuration 1 as the first UL/DL configuration, not all subframes, which are defined as uplink subframes, can be used for PUSCH transmissions because, for instance, the association does not indicated a timing relation among the plural timing relations identifying subframe 4 as subframe for PUSCH transmissions. In case of first UL/DL configurations 2 and 5, some slight scheduling flexibility is lost compared to the first embodiment because each uplink subframe according to the first UL/DL configuration can be assigned by a single subframe n only, respectively.

According to a variation of the second embodiment, in case the first and second UL/DL configurations are different and the second UL/DL configuration is UL/DL configuration 0, at least one timing relation between the subframe n where the DCI transmission granting the PUSCH transmission occurs and the corresponding PUSCH transmission is configurable, preferably semi-statically using e.g. RRC signaling. For example, such a semi-static parameter determines whether a DCI transmission in subframe 1 corresponds to a PUSCH transmission to be performed in subframe 7 (i.e. 1+6) or 8 (i.e. 1+7). In this respect the semi-static parameter would set the assumed two uplink index bits to either (1, 0) or (0, 1), thereby determining the single timing relation (i.e. subframe offset) to be either 6 or 7 among the plural timing relations 6 and 7 of the DCI to PUSCH timing relations, respectively. This allows a more flexible scheduler implementation, and potentially establishing timing relations with a smaller delay at the potential cost of fewer assignable PUSCH transmissions and the cost of implementing and testing the configurability and its correct behavior.

Third Embodiment

In an alternative embodiment, similar to the first embodiment, the DCI to PUSCH timing relations in case of ambiguity can be resolved by modifying the corresponding timing relation definitions, using the reasoning for defining the assumed uplink index bits. For efficient implementations, it is beneficial if no new timing offsets are introduced, but rather from the existing a subset is chosen.

In this embodiment, in case the first and second UL/DL configuration are different and the second UL/DL configuration is 0, the mobile station determines the DCI to PUSCH timing offsets from the below table, where the entries form a subset of the entries listed by FIG. 7.

TABLE

DCI to PUSCH offset determination in case of different first and second UL/DL configuration and second UL/DL configuration 0 according to the third embodiment

| First UL/DL Configuration | PDCCH in subframe n PUSCH in subframe n + k | | | | | | | | | |
|---|---|---|---|---|---|---|---|---|---|---|
| | 0 | 1 | 2 | 3 | 4 | 5 | 6 | 7 | 8 | 9 |
| 1 | | 7 | 7 | | | | 7 | 7 | | |
| 2 | | 7 | 6 | | | | 7 | 6 | | |
| 3 | 4 | | | | | | 7 | 7 | | |
| 4 | | | | | | | 7 | 7 | | |
| 5 | | | | | | | 7 | 6 | | |
| 6 | 4 | 6 | | | | | 7 | 7 | | |

According to a variation of this embodiment, at least one of the offsets k shown in the table is configurable, preferably semi-statically using e.g. RRC signalling. This can be particularly advantageous as exemplified for the first embodiment mutatis mutandi, e.g. to enable scheduling for subframe 8 in case of first UL/DL configuration 6, or for enhanced scheduler flexibility.

Fourth Embodiment

In an alternative embodiment, similar to the second embodiment, the DCI to PUSCH timing relations in case of ambiguity can be resolved by modifying the corresponding timing relation definitions, using the reasoning for defining the assumed uplink index bits. For efficient implementations, it is beneficial if no new timing offsets are introduced, but rather from the existing a subset is chosen.

In this embodiment, in case that the first and second UL/DL configuration are different and the second UL/DL configuration is 0, the mobile station determines the DCI to PUSCH timing offsets from the below table, where the entries form a subset of the entries listed by FIG. 7.

TABLE

DCI to PUSCH offset determination in case of different first and second UL/DL configuration and second UL/DL configuration 0 according to the fourth embodiment

| PDCCH in subframe n PUSCH in subframe n + k | | | | | | | | | | |
|---|---|---|---|---|---|---|---|---|---|---|
| 0 | 1 | 2 | 3 | 4 | 5 | 6 | 7 | 8 | 9 |
| 4 | 6 | | | | 7 | 7 | | | |

According to a variation of this embodiment, at least one of the offsets k shown in the table is configurable, preferably semi-statically using e.g. RRC signaling. This can be particularly advantageous as exemplified for the second embodiment mutatis mutandi, e.g. to enable scheduling for different uplink subframes in case of first UL/DL configurations 1 or 6, or for enhanced scheduler flexibility e.g. in case of first UL/DL configurations 2 or 5.

Hardware and Software Implementation of the Invention

Another embodiment of the invention relates to the implementation of the above described various embodiments using hardware and software. In this connection the invention provides an user equipment (mobile station) and an eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also, a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may, individually or in arbitrary combination, be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for performing a Physical Uplink Shared CHannel, PUSCH, transmission by a mobile station in response to a Downlink Control Information, DCI, transmission utilizing Time Division Duplex, TDD, communication based on at least one of a plurality of uplink/downlink configurations, wherein the mobile station is configured for communication with a base station in a communication system according to a first of the plurality of uplink/downlink configurations, each of the plurality of uplink/downlink configurations defining the subframes of a radio frame as an uplink subframe, a downlink subframe or a special subframe, and wherein the mobile station applies uplink reference timing relations for the communication on the basis of a second of the plurality uplink/downlink configurations, the uplink reference timing relations defining one or plural timing relation(s) for performing one or plural PUSCH transmission(s) in response to a single DCI transmission, wherein the method comprises the following steps to be performed by the mobile station:

receiving in a subframe, defined as downlink subframe or special subframe, a DCI transmission in response to which a PUSCH transmission is to be performed;

determining, by applying the uplink reference timing relations, a single timing relation for a PUSCH transmission according to the subframe in which the corresponding DCI transmission is received; and performing the PUSCH transmission in a single subframe defined as an uplink subframe by the first uplink/downlink configuration, the uplink subframe corresponding to the determined single timing relation; wherein:

in case the first uplink/downlink configuration, according to which the communication is configured, is different from the second uplink/downlink configuration, on the basis of which the uplink reference timing relations are defined, and in case these uplink reference timing relations define plural timing relations for performing PUSCH transmissions in response to a single DCI transmission, the mobile station refers, as part of the determining step, to a pre-stored association indicating the single timing relation among the plural timing relations that is to be used for the PUSCH transmission based on the subframe in which the corresponding DCI transmission is received.

2. The method according to claim 1, wherein the pre-stored association indicates the single timing relation among the plural timing relations that is to be used for the PUSCH transmission based on the subframe in which the corresponding DCI transmission is received and on the first uplink/downlink configuration according to which the communication with the base station is configured.

3. The method according to claim 1, wherein the pre-stored association indicates the single timing relation that is to be used for a PUSCH transmission for each of the subframes in which a corresponding DCI transmission can be received.

4. The method according to claim 1, wherein the pre-stored association indicates the single timing relation that is to be used for a PUSCH transmission for each of the subframes in which a corresponding DCI transmission can be received, and for each of the plurality of uplink/downlink configurations according to which the communication with the base station can be configured as first uplink/downlink configuration.

5. The method according to claim 1, wherein the pre-stored association comprises an index for indicating by referring to the uplink reference timing relations which single of the plural timing relations for performing the PUSCH transmission is to be used.

6. The method according to claim 1, wherein the association is pre-stored in the mobile station.

7. The method according to claim 1, wherein:

the first uplink/downlink configuration is any of the uplink/downlink configurations 1-6, and the second uplink/downlink configuration is uplink/downlink configuration 0; and/or wherein the DCI transmission in response to which a PUSCH transmission is to be performed is of DCI format 0 or DCI format 4.

8. A mobile station for performing a Physical Uplink Shared CHannel, PUSCH, transmission in response to a Downlink Control Information, DCI, transmission utilizing Time Division Duplex, TDD, communication based on at least one of a plurality of uplink/downlink configurations, wherein the mobile station is configured for communication with a base station in a communication system according to a first of the plurality of uplink/downlink configurations, each of the plurality of uplink/downlink configurations defining the subframes of a radio frame as an uplink subframe, a downlink subframe or a special subframe, and wherein the mobile station applies uplink reference timing relations for the communication on the basis of a second of the plurality uplink/downlink configurations, the uplink reference timing relations defining one or plural timing relation(s) for performing one or plural PUSCH transmission(s) in response to a single DCI transmission, wherein the mobile station comprises:

a receiving circuit configured to receive in a subframe, defined as downlink subframe or special subframe, a DCI transmission in response to which a PUSCH transmission is to be performed;

a processor configured to determine, by applying the uplink reference timing relations, a single timing relation for a PUSCH transmission according to the subframe in which the corresponding DCI transmission is received; and a transmitting circuit configured to perform the PUSCH transmission in a single subframe defined as an uplink subframe by the first uplink/downlink configuration, the uplink subframe corresponding to the determined single timing relation; wherein:

in case the first uplink/downlink configuration, according to which the communication is configured, is different from the second uplink/downlink configuration, on the basis of which the uplink reference timing relations are defined, and in case these uplink reference timing relations define plural timing relations for performing PUSCH transmissions in response to a single DCI transmission, the processor is configured to refer to a pre-stored association indicating the single timing relation among the plural timing relations that is to be used for the PUSCH transmission based on the subframe in which the corresponding DCI transmission is received.

9. The mobile station according to claim 8, wherein the pre-stored association indicates the single timing relation among the plural timing relations that is to be used for the PUSCH transmission based on the subframe in which the corresponding DCI transmission is received and on the first uplink/downlink configuration according to which the communication with the base station is configured.

10. The mobile station according to claim 8, wherein the pre-stored association indicates the single timing relation that is to be used for a PUSCH transmission for each of the subframes in which a corresponding DCI transmission can be received.

11. The mobile station according to claim 8, wherein the pre-stored association indicates the single timing relation that is to be used for a PUSCH transmission for each of the subframes in which a corresponding DCI transmission can be received, and for each of the plurality of uplink/downlink configurations according to which the communication with the base station can be configured as first uplink/downlink configuration.

12. The mobile station according to claim 8, wherein the pre-stored association comprises an index for indicating by referring to the uplink reference timing relations which single of the plural timing relations for performing the PUSCH transmission is to be used.

13. The mobile station according to claim 8, wherein the association is pre-stored in the mobile station.

14. The mobile station according to claim 8, wherein:
the first uplink/downlink configuration is any of the uplink/downlink configurations 1-6, and the second uplink/downlink configuration is uplink/downlink configuration 0; and/or wherein
the DCI transmission in response to which a PUSCH transmission is to be performed is of DCI format 0 or DCI format 4.

15. A non-transitory computer readable medium storing instruction that, when executed by a processor of a mobile station, cause the mobile station to perform a Physical Uplink Shared CHannel, PUSCH, transmission in response to a Downlink Control Information, DCI, transmission utilizing Time Division Duplex, TDD, communication based on at least one of a plurality of uplink/downlink configurations,
wherein the mobile station is configured for communication with a base station in a communication system according to a first of the plurality of uplink/downlink configurations, each of the plurality of uplink/downlink configurations defining the subframes of a radio frame as an uplink subframe, a downlink subframe or a special subframe, and
wherein the mobile station applies uplink reference timing relations for the communication on the basis of a second of the plurality uplink/downlink configurations, the uplink reference timing relations defining one or plural timing relation(s) for performing one or plural PUSCH transmission(s) in response to a single DCI transmission, comprising:
receiving in a subframe, defined as downlink subframe or special subframe, a DCI transmission in response to which a PUSCH transmission is to be performed;
determining, by applying the uplink reference timing relations, a single timing relation for a PUSCH transmission according to the subframe in which the corresponding DCI transmission is received; and
performing the PUSCH transmission in a single subframe defined as an uplink subframe by the first uplink/downlink configuration, the uplink subframe corresponding to the determined single timing relation; wherein:
in case the first uplink/downlink configuration, according to which the communication is configured, is different from the second uplink/downlink configuration, on the basis of which the uplink reference timing relations are defined, and in case these uplink reference timing relations define plural timing relations for performing PUSCH transmissions in response to a single DCI transmission,
the mobile station is to refer, as part of the determining step, to a pre-stored association indicating the single timing relation among the plural timing relations that is to be used for the PUSCH transmission based on the subframe in which the corresponding DCI transmission is received.

* * * * *